United States Patent
Yang et al.

(10) Patent No.: US 11,076,362 B2
(45) Date of Patent: *Jul. 27, 2021

(54) METHOD AND APPARATUS FOR TRANSMITTING UPLINK SIGNALS IN WIRELESS COMMUNICATION

(71) Applicant: LG ELECTRONICS INC., Seoul (KR)

(72) Inventors: Suckchel Yang, Seoul (KR); Joonkui Ahn, Seoul (KR); Dongyoun Seo, Seoul (KR); Yunjung Yi, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 16/932,485

(22) Filed: Jul. 17, 2020

(65) Prior Publication Data

US 2020/0351793 A1    Nov. 5, 2020

Related U.S. Application Data

(63) Continuation of application No. 16/591,321, filed on Oct. 2, 2019, now Pat. No. 10,736,047, which is a (Continued)

(51) Int. Cl.
*H04W 52/14* (2009.01)
*H04W 72/04* (2009.01)
(Continued)

(52) U.S. Cl.
CPC .......... *H04W 52/146* (2013.01); *H04L 1/18* (2013.01); *H04L 1/1854* (2013.01); (Continued)

(58) Field of Classification Search
CPC ....... H04L 1/1671; H04L 1/18; H04L 1/1854; H04L 1/1861; H04L 27/2607; H04L 5/00; (Continued)

(56) References Cited

U.S. PATENT DOCUMENTS

| 8,638,738 B2 | 1/2014 | Yang et al. |
| 8,649,343 B2 | 2/2014 | Ahn et al. |

(Continued)

FOREIGN PATENT DOCUMENTS

| CN | 102301801 | 12/2011 |
| CN | 102348269 | 2/2012 |

(Continued)

OTHER PUBLICATIONS

PCT International Application No. PCT/KR2014/000059, Written Opinion of the International Searching Authority dated Apr. 15, 2014, 15 pages.

(Continued)

*Primary Examiner* — Tan H Trinh
(74) *Attorney, Agent, or Firm* — Lee, Hong, Degerman, Kang & Walmey

(57) ABSTRACT

The present invention relates to a wireless communication system. More particularly, the present invention relates to a method and an apparatus for a terminal controlling uplink power in a carrier aggregation-based wireless communication system, comprising the steps of: configuring a first cell and a second cell; transmitting a first PUCCH signal from subframe #n in the first cell; and transmitting a second PUCCH signal from subframe #n in the second cell, wherein when the sum of transmit power of the first PUCCH signal and transmit power of the second PUCCHJ signal exceeds a predetermined maximum transmit power configured to the terminal, the transmit power of the PUCCH signal having a lower priority from among the first UCCH signal and the second PUCCH signal is reduced or the transmission is dropped.

13 Claims, 11 Drawing Sheets

* In the case of simultaneous UL transmission in PCell (group) and SCell (group) and maximum power limitation, UL transmission of PCell (group) and/or SCell (group) can be controlled in power or can be dropped.

Related U.S. Application Data continuation of application No. 16/196,942, filed on Nov. 20, 2018, now Pat. No. 10,455,515, which is a continuation of application No. 15/704,956, filed on Sep. 14, 2017, now Pat. No. 10,142,941, which is a continuation of application No. 15/352,369, filed on Nov. 15, 2016, now Pat. No. 9,801,141, which is a continuation of application No. 14/759,164, filed as application No. PCT/KR2014/000057 on Jan. 3, 2014, now Pat. No. 9,520,984.

(60) Provisional application No. 61/748,720, filed on Jan. 3, 2013, provisional application No. 61/750,307, filed on Jan. 8, 2013, provisional application No. 61/808,614, filed on Apr. 4, 2013, provisional application No. 61/817,341, filed on Apr. 30, 2013, provisional application No. 61/836,176, filed on Jun. 18, 2013, provisional application No. 61/838,350, filed on Jun. 24, 2013, provisional application No. 61/866,555, filed on Aug. 16, 2013, provisional application No. 61/872,858, filed on Sep. 3, 2013, provisional application No. 61/890,347, filed on Oct. 14, 2013, provisional application No. 61/897,202, filed on Oct. 29, 2013.

(51) Int. Cl.

| | | |
|---|---|---|
| *H04W 52/28* | (2009.01) | |
| *H04W 52/36* | (2009.01) | |
| *H04W 52/58* | (2009.01) | |
| *H04W 52/50* | (2009.01) | |
| *H04L 5/14* | (2006.01) | |
| *H04L 5/00* | (2006.01) | |
| *H04L 27/26* | (2006.01) | |
| *H04L 1/18* | (2006.01) | |
| H04W 88/02 | (2009.01) | |
| H04W 52/32 | (2009.01) | |
| H04W 52/34 | (2009.01) | |
| H04W 76/15 | (2018.01) | |
| H04W 52/40 | (2009.01) | |
| H04L 1/16 | (2006.01) | |

(52) U.S. Cl.
CPC .............. *H04L 1/1861* (2013.01); *H04L 5/00* (2013.01); *H04L 5/001* (2013.01); *H04L 5/0055* (2013.01); *H04L 5/14* (2013.01); *H04L 27/2607* (2013.01); *H04W 52/281* (2013.01); *H04W 52/367* (2013.01); *H04W 52/50* (2013.01); *H04W 52/58* (2013.01); *H04W 72/0406* (2013.01); *H04W 72/0413* (2013.01); *H04W 72/0453* (2013.01); *H04L 1/1671* (2013.01); *H04W 52/325* (2013.01); *H04W 52/34* (2013.01); *H04W 52/365* (2013.01); *H04W 52/40* (2013.01); *H04W 72/0446* (2013.01); *H04W 76/15* (2018.02); *H04W 88/02* (2013.01)

(58) Field of Classification Search
CPC ......... H04L 5/001; H04L 5/0055; H04L 5/14; H04W 52/146; H04W 52/281; H04W 52/325; H04W 52/34; H04W 52/365; H04W 52/367; H04W 52/40; H04W 52/50; H04W 52/58; H04W 72/0406; H04W 72/0413; H04W 72/0446; H04W 72/0453; H04W 76/15; H04W 88/02
USPC .......................... 455/69, 522, 13.3; 370/329
See application file for complete search history.

(56) References Cited

U.S. PATENT DOCUMENTS

| | | |
|---|---|---|
| 8,705,397 B2 | 4/2014 | Ahn et al. |
| 8,861,391 B1 | 10/2014 | Zhang et al. |
| 8,902,842 B1 | 12/2014 | Gomadam et al. |
| 8,917,603 B2 | 12/2014 | Yang et al. |
| 9,014,173 B2 | 4/2015 | Yang et al. |
| 9,124,327 B2 | 9/2015 | Gomadam et al. |
| 9,172,519 B2 | 10/2015 | Seo et al. |
| 9,331,819 B2 | 5/2016 | Si et al. |
| 9,497,011 B2 | 11/2016 | Gao et al. |
| 9,515,782 B2 | 12/2016 | Lin et al. |
| 9,520,984 B2 | 12/2016 | Yang et al. |
| 9,572,138 B2 | 2/2017 | Lee et al. |
| 9,801,141 B2 | 10/2017 | Yang et al. |
| 9,807,707 B2 | 10/2017 | Shimezawa et al. |
| 9,867,138 B2 | 1/2018 | Yang et al. |
| 9,980,234 B2 | 5/2018 | Yang et al. |
| 10,142,941 B2 | 11/2018 | Yang et al. |
| 10,172,096 B2 | 1/2019 | Yang et al. |
| 10,429,941 B2 | 10/2019 | Kamoda et al. |
| 10,455,515 B2 * | 10/2019 | Yang .................... H04L 1/1861 |
| 10,531,398 B2 | 1/2020 | Yang et al. |
| 10,736,047 B2 | 8/2020 | Yang et al. |
| 2010/0254329 A1 | 10/2010 | Pan et al. |
| 2011/0235602 A1 | 9/2011 | Ji et al. |
| 2011/0250899 A1 | 10/2011 | Vajapeyam et al. |
| 2011/0261729 A1 | 10/2011 | Ahn et al. |
| 2011/0261776 A1 | 10/2011 | Ahn et al. |
| 2011/0268045 A1 | 11/2011 | Heo et al. |
| 2011/0275403 A1 | 11/2011 | Chen et al. |
| 2011/0287804 A1 | 11/2011 | Seo et al. |
| 2011/0292826 A1 | 12/2011 | Ahu et al. |
| 2012/0009963 A1 | 1/2012 | Kim et al. |
| 2012/0039280 A1 | 2/2012 | Chen et al. |
| 2012/0057547 A1 | 3/2012 | Lohr et al. |
| 2012/0113907 A1 | 5/2012 | Baldemair et al. |
| 2012/0113910 A1 | 5/2012 | Jen |
| 2012/0224552 A1 | 9/2012 | Feuersanger et al. |
| 2012/0269179 A1 | 10/2012 | Li et al. |
| 2012/0327821 A1 | 12/2012 | Lin et al. |
| 2013/0028134 A1 | 1/2013 | Wang et al. |
| 2013/0028214 A1 | 1/2013 | Imamura et al. |
| 2013/0039289 A1 | 2/2013 | Lee et al. |
| 2013/0051259 A1 | 2/2013 | Kim et al. |
| 2013/0051344 A1 | 2/2013 | Miki et al. |
| 2013/0058315 A1 | 3/2013 | Feuersaenger et al. |
| 2013/0077514 A1 | 3/2013 | Dinan |
| 2013/0128854 A1 * | 5/2013 | Nakashima ........... H04L 1/1861 |
| | | 370/329 |
| 2013/0148614 A1 | 6/2013 | Noh et al. |
| 2013/0208710 A1 | 8/2013 | Seo et al. |
| 2013/0250925 A1 | 9/2013 | Lohr et al. |
| 2013/0272229 A1 | 10/2013 | Dinan |
| 2013/0279433 A1 * | 10/2013 | Dinan ...................... H04J 11/00 |
| | | 370/329 |
| 2013/0295976 A1 | 11/2013 | Patil et al. |
| 2013/0336300 A1 | 12/2013 | Choi et al. |
| 2014/0029584 A1 | 1/2014 | Qu et al. |
| 2014/0029586 A1 | 1/2014 | Loehr et al. |
| 2014/0036810 A1 * | 2/2014 | Harrison ........... H04W 72/0413 |
| | | 370/329 |
| 2014/0050205 A1 | 2/2014 | Ahn et al. |
| 2014/0056278 A1 | 2/2014 | Marinier et al. |
| 2014/0078941 A1 | 3/2014 | Seo et al. |
| 2014/0092856 A1 | 4/2014 | Yang et al. |
| 2014/0126403 A1 | 5/2014 | Siomina |
| 2014/0126440 A1 | 5/2014 | Frank et al. |
| 2014/0126530 A1 | 5/2014 | Siomina et al. |
| 2014/0128115 A1 | 5/2014 | Siomina et al. |
| 2014/0171144 A1 | 6/2014 | Kim et al. |
| 2014/0192757 A1 | 7/2014 | Lee et al. |
| 2014/0204811 A1 | 7/2014 | Lu et al. |
| 2014/0226551 A1 | 8/2014 | Ouchi et al. |
| 2014/0295909 A1 | 10/2014 | Ouchi et al. |
| 2014/0302866 A1 | 10/2014 | Lee et al. |
| 2015/0156764 A1 | 6/2015 | Yang et al. |

(56) References Cited

U.S. PATENT DOCUMENTS

| | | | |
|---|---|---|---|
| 2015/0188687 A1 | 7/2015 | Gao et al. | |
| 2015/0208402 A1 | 7/2015 | Hwang et al. | |
| 2015/0215944 A1 | 7/2015 | Kim et al. | |
| 2015/0230236 A1* | 8/2015 | Zeng | H04L 41/0806 370/329 |
| 2015/0304967 A1 | 10/2015 | Kim et al. | |
| 2015/0319703 A1 | 11/2015 | Kwon et al. | |
| 2015/0327243 A1 | 11/2015 | Yin et al. | |
| 2015/0341864 A1 | 11/2015 | Yang et al. | |
| 2015/0358924 A1 | 12/2015 | Papasakellariou | |
| 2015/0365831 A1* | 12/2015 | Ko | H04L 5/0053 370/329 |
| 2016/0044606 A1 | 2/2016 | Yin | |
| 2017/0013563 A1 | 1/2017 | Yang et al. | |
| 2017/0064639 A1 | 3/2017 | Yang et al. | |
| 2017/0142666 A1 | 5/2017 | Shimezawa et al. | |
| 2017/0230917 A1 | 8/2017 | Ouchi et al. | |
| 2018/0007637 A1 | 1/2018 | Yang et al. | |
| 2018/0007642 A1 | 1/2018 | Feuersaenger et al. | |
| 2019/0090203 A1 | 3/2019 | Yang et al. | |
| 2019/0098580 A1 | 3/2019 | Babaei et al. | |

FOREIGN PATENT DOCUMENTS

| | | |
|---|---|---|
| CN | 102349253 | 2/2012 |
| CN | 102687567 | 9/2012 |
| CN | 102687577 | 9/2012 |
| CN | 102845016 | 12/2012 |
| EP | 2421191 | 2/2012 |
| JP | 2012104960 | 5/2012 |
| JP | 2012516607 | 7/2012 |
| JP | 2012517747 | 8/2012 |
| JP | 2012-191666 | 10/2012 |
| JP | 2012216968 | 11/2012 |
| JP | 2013529030 | 7/2013 |
| KR | 1020050081136 | 8/2005 |
| KR | 10-2010-0100667 | 9/2010 |
| KR | 10-2011-0127253 | 11/2011 |
| KR | 10-2012-0090081 | 8/2012 |
| KR | 10-2012-0093913 | 8/2012 |
| KR | 10-2012-0094923 | 8/2012 |
| WO | 2010087622 | 8/2010 |
| WO | 2010091425 | 8/2010 |
| WO | 2010/103862 | 9/2010 |
| WO | 2011/053056 | 5/2011 |
| WO | 2011120716 | 10/2011 |
| WO | 2011139027 | 11/2011 |
| WO | 2011140504 | 11/2011 |
| WO | 2011159121 | 12/2011 |
| WO | 2012008773 | 1/2012 |
| WO | 2012017941 | 2/2012 |
| WO | 2012036514 | 3/2012 |
| WO | 2012094151 | 7/2012 |
| WO | 2012128513 | 9/2012 |

OTHER PUBLICATIONS

European Patent Office Application Serial No. 19163948.3, Search Report dated Jun. 26, 2019, 11 pages.
Fujitsu, "Discussion on simultaneous transmissions of PRACH and PUCCH/PUSCH/SRS", R1-120754, 3GPP TSG RAN WG1 Meeting #68, Feb. 2012, XP050563365, 4 pages.
Intel Corporation, "UL Power Control with multiple TA", R1-123166, 3GPP TSG-RAN WG1 #70, Aug. 2012, XP050661058, 3 pages.
Nokia Siemens Networks, Nokia, "On Multiple Timing Advance in RAN1", R1-120712, 3GPP TSG-RAN WG1 Meeting #68, Feb. 2012, XP050563096, 2 pages.
Nokia Siemens Networks, Nokia Corporation, "Multiple TA", R2-112945, 3GPP TSG-RAN WG2 Meeting #74, May 2011, XP050495303, 2 pages.
U.S. Appl. No. 16/196,942, Notice of Allowance dated Jun. 12, 2019, 14 pages.
U.S. Appl. No. 16/591,321, Office Action dated Nov. 5, 2019, 8 pages.
European Patent Office Application Serial No. 14735347.8, Search Report dated Jul. 21, 2016, 10 pages.
European Patent Office Application Serial No. 14735251.2, Search Report dated Aug. 2, 2016, 7 pages.
European Patent Office Application Serial No. 14735104.3, Search Report dated Jul. 28, 2016, 8 pages.
European Patent Office Application Serial No. 14735393.2, Search Report dated Jul. 27, 2016, 9 pages.
Qualcomm Incorporated, "Support of CA for different TDD UL-DL configurations", R1-121793, 3GPP TSG RAN WG1 #68-BIS, Mar. 2012, 3 pages.
Yufei W. Blankenship, "Achieving High Capacity with Small Cells in LTE-A", Fiftieth Annual Allerton Conference, XP032345203, Oct. 2012, 8 pages.
CMCC, "Discussion on the solutions for common information interference coordination in TDD systems", R1-106312, 3GPP TSG-RAN WG1#63, Nov. 2010, 5 pages.
CATT, "Resource Allocation for PUCCH Format 3", R1-105153, 3GPP TSG RAN WG1 Meeting #62bis, Oct. 2010, 3 pages.
Qualcomm Incorporated, "UL Power Control for Multicarrier Operation" R1-100677, 3GPP TSG RAN WG1 #59bis, Jan. 2010, 5 pages.
European Patent Office Application Serial No. 14735104.3, Office Action dated Jun. 7, 2017, 6 pages.
HTC, et al, "Reusing PUCCH format 3 to multiplex CSI reports for DL CoMP", R1-124350, 3GPP TSG-RAN WGl #70bis, Oct. 2012, 5 pages.
ST-Ericsson, "CSI requirement for Rel-IO CA", R4-124223, 3GPP TSG-RAN WG4 Meeting #64, Aug. 2012, 6 pages.
The State Intellectual Property Office of the People's Republic of China Application Serial No. 201480003962.0 Office Action dated Jul. 4, 2017, 6 pages.
U.S. Appl. No. 14/759,177, Final Office Action dated Mar. 9, 2017, 25 pages.
U.S. Appl. No. 14/759,161, Office Action dated Mar. 24, 2017, 11 pages.
European Patent Office Application Serial No. 19163947.5, Search Report dated Sep. 10, 2019, 9 pages.
Texas Instruments, "Support of Multiple Timing Advances", R1-113483, 3GPP TSG RAN WG1 #66bis, Oct. 2011, 3 pages.
Research in Motion, UK Limited, "Discussion on the complexities of multiple TA", R2-113031, 3GPP TSG RAN WG2 Meeting #74, May 2011, 2 pages.
ZTE, "Uplink Control Channel Design for LTE-Advanced", R1-091427, TSG-RAN WG1 #56bis, Mar. 2009, 6 pages.
Huawei, "Overview of UL ACKNACK feedback design issues for carrier aggregation", R1-103087, 3GPP TSG RAN WG1 Meeting #61, May 2010, 5 pages.
U.S. Appl. No. 16/196,968, Office Action dated Jan. 11, 2019, 9 pages.
PCT International Application No. PCT/KR2014/000060, Written Opinion of the International Searching Authority dated Apr. 22, 2014, 18 pages.
PCT International Application No. PCT/KR2014/000057, Written Opinion of the International Searching Authority dated May 16, 2014, 16 pages.
U.S. Appl. No. 16/593,538, Office Action dated Apr. 3, 2020, 9 pages.
PCT International Application No. PCT/KR2014/000058, Written Opinion of the International Searching Authority dated Mar. 31, 2014, 15 pages.
U.S. Appl. No. 14/759,170, Office Action dated Mar. 4, 2016, 15 pages.
State Intellectual Property Office of the People's Republic of China Application Serial No. 201480003965.4, Office Action dated Nov. 6, 2017, 14 pages.
Intel Corporation, "UL Control Enhancements for Small Cell Environments", R1-132391, 3GPP TSG RAN WG1 Meeting #73, May 2013, 4 pages.
Fujitsu, "Discussion on physical layer impacts of dual connectivity", R1-133138, 3GPP TSG RAN WG1 Meeting #74, Aug. 2013, 5 pages.

(56) References Cited

OTHER PUBLICATIONS

U.S. Appl. No. 15/704,956, Notice of Allowance dated Jul. 18, 2018, 13 pages.
U.S. Appl. No. 15/704,956, Office Action dated Apr. 4, 2018, 13 pages.
European Patent Office Application Serial No. 19163948.3, Office Action dated Sep. 24, 2020, 7 pages.
European Patent Office Application Serial No. 19163947.5, Office Action dated Sep. 28, 2020, 8 pages.
Korean Intellectual Property Office Application No. 10-2015-7019127, Notice of Allowance dated Nov. 13, 2020, 6 pages.
NTT DoCoMo, "UL Simultaneous Transmissions for Multiple TA", R1-120400, 3GPP TSG RAN WG1 Meeting #68, Feb. 2012, 4 pages.
Panasonic, "Remaining details of PUSCH/PUCCH/SRS simultaneous transmissions in Rel. 10", R1-110197, 3GPP TSG RAN WG1 Meeting #63bis, Jan. 2011, 6 pages.
Nokia Siemens Networks, "Carrier Based ICIC for Inter-Site CA Optimization", R3-120283, 3GPP TSG-RAN WG3 Meeting #75, Feb. 2011, 5 pages.
LG Electronics, "Uplink ACK/NACK transmission in LTE-Advanced", R1-094163, 3GPP TSG RAN WG1 #58bis, Oct. 2009, 6 pages.

\* cited by examiner

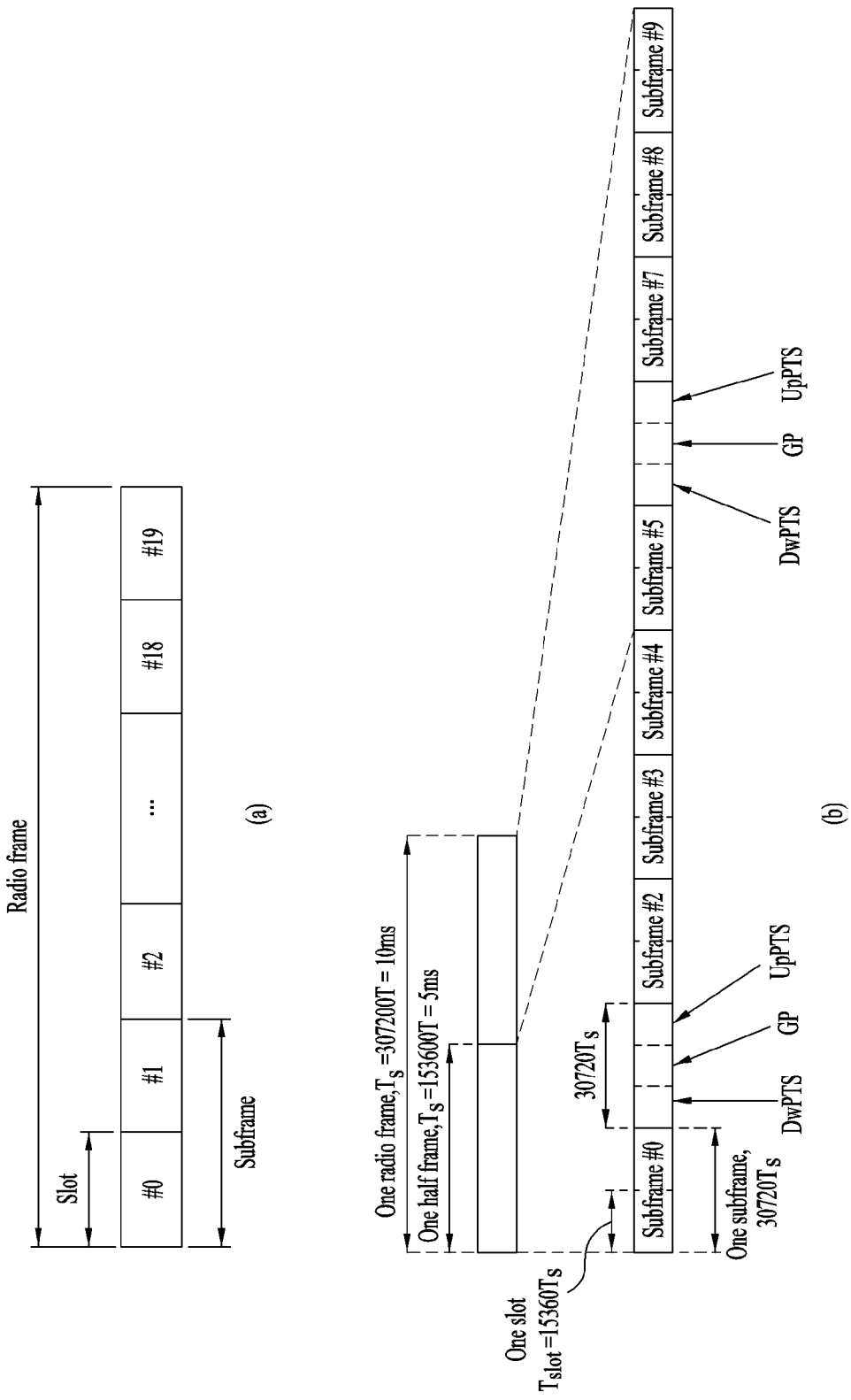

PUCCH format 1a and 1b structure (normal CP case)

| $C_7$ | $C_6$ | $C_5$ | $C_4$ | $C_3$ | $C_2$ | $C_1$ | R |
|---|---|---|---|---|---|---|---|
| P | V | \multicolumn{6}{l|}{PH (Type 2, PCell)} |
| R | R | \multicolumn{6}{l|}{$P_{CMAX,c}$ 1} |
| P | V | \multicolumn{6}{l|}{PH (Type 1, PCell)} |
| R | R | \multicolumn{6}{l|}{$P_{CMAX,c}$ 2} |
| P | V | \multicolumn{6}{l|}{PH (Type 1, SCell 1)} |
| R | R | \multicolumn{6}{l|}{$P_{CMAX,c}$ 3} |
| \multicolumn{8}{c|}{...} |
| P | V | \multicolumn{6}{l|}{PH (Type 1, SCell n)} |
| R | R | \multicolumn{6}{l|}{$P_{CMAX,c}$ m} |

\* In the case of simultaneous UL transmission in PCell (group) and SCell (group) and maximum power limitation, UL transmission of PCell (group) and/or SCell (group) can be controlled in power or can be dropped.

METHOD AND APPARATUS FOR TRANSMITTING UPLINK SIGNALS IN WIRELESS COMMUNICATION

CROSS-REFERENCE TO RELATED APPLICATIONS

This application is a continuation of U.S. patent application Ser. No. 16/591,321, filed on Oct. 2, 2019, now U.S. Pat. No. 10,736,047, which is a continuation of U.S. patent application Ser. No. 16/196,942, filed on Nov. 20, 2018, now U.S. Pat. No. 10,455,515, which is a continuation of U.S. patent application Ser. No. 15/704,956, filed on Sep. 14, 2017, now U.S. Pat. No. 10,142,941, which is a continuation of U.S. patent application Ser. No. 15/352,369, filed on Nov. 15, 2016, now U.S. Pat. No. 9,801,141, which is a continuation of U.S. patent application Ser. No. 14/759,164, filed on Jul. 2, 2015, now U.S. Pat. No. 9,520,984, which is the National Stage filing under 35 U.S.C. 371 of International Application No. PCT/KR2014/000057, filed on Jan. 3, 2014, which claims the benefit of U.S. Provisional Application Nos. 61/748,720, filed on Jan. 3, 2013, 61/750,307, filed on Jan. 8, 2013, 61/808,614, filed on Apr. 4, 2013, 61/817,341, filed on Apr. 30, 2013, 61/836,176, filed on Jun. 18, 2013, 61/838,350, filed on Jun. 24, 2013, 61/866,555, filed on Aug. 16, 2013, 61/872,858, filed on Sep. 3, 2013, 61/890,347, filed on Oct. 14, 2013 and 61/897,202, filed on Oct. 29, 2013, the contents of which are all hereby incorporated by reference herein in their entirety.

TECHNICAL FIELD

The present invention relates to a wireless communication system and, more particularly, a method and an apparatus for transmitting uplink signals in a carrier aggregation (CA)-based wireless communication system.

BACKGROUND ART

Generally, a wireless communication system is developing to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may include one of CDMA (code division multiple access) system, FDMA (frequency division multiple access) system, TDMA (time division multiple access) system, OFDMA (orthogonal frequency division multiple access) system, SC-FDMA (single carrier frequency division multiple access) system and the like.

DISCLOSURE

Technical Problem

An object of the present invention is to provide a method and an apparatus for efficiently transmitting/receiving uplink signals in a CA-based wireless communication system. Specifically, the present invention provides a method for efficiently transmitting/receiving uplink signals in inter-site carrier aggregation (CA) and an apparatus therefor.

Technical tasks obtainable from the present invention are non-limited the above-mentioned technical task. And, other unmentioned technical tasks can be clearly understood from the following description by those having ordinary skill in the technical field to which the present invention pertains.

Technical Solution

According to one aspect of the present invention, a method for controlling, by a UE, uplink power in a carrier aggregation based wireless communication system includes: configuring a first cell and a second cell; performing a procedure for transmitting a first physical uplink control channel (PUCCH) signal in subframe #n of the first cell; and performing a procedure for transmitting a second PUCCH signal in subframe #n of the second cell, wherein, when the sum of transmit power of the first PUCCH signal and transmit power of the second PUCCHJ signal exceeds a predetermined maximum transmit power set for the UE, the transmit power of the PUCCH signal having a lower priority from among the first UCCH signal and the second PUCCH signal is reduced or the transmission is dropped.

According to another aspect of the present invention, a UE configured to control uplink power in a carrier aggregation based wireless communication system includes: a radio frequency (RF) unit; and a processor, wherein the processor is configured to configure a first cell and a second cell, to perform a procedure for transmitting a first PUCCH signal in subframe #n of the first cell, and to perform a procedure for transmitting a second PUCCH signal in subframe #n of the second cell, wherein, when the sum of transmit power of the first PUCCH signal and transmit power of the second PUCCHJ signal exceeds a predetermined maximum transmit power set for the UE, the transmit power of the PUCCH signal having a lower priority from among the first PUCCH signal and the second PUCCH signal is reduced or the transmission of the PUCCH signal having a lower priority is dropped.

When a maximum power limit of the first cell is higher that of the second cell, priority of the first PUCCH signal may be lower than that of the second PUCCH signal.

When the first cell is configured as a frequency division duplex (FDD) cell and the second cell is configured as a time division duplex (TDD) cell, priority of the second PUCCH signal may be lower than that of the first PUCCH signal.

When the first cell is configured to an extended cyclic prefix (CP) and the second cell is configured to a normal CP, priority of the second PUCCH signal may be lower than that of the first PUCCH signal.

When the first cell is a primary cell (PCell) and the second cell is a secondary cell (SCell), priority of the second PUCCH signal may be lower than that of the first PUCCH signal.

Advantageous Effects

According to the present invention, it is possible to efficiently transmit/receive uplink signals in a CA-based wireless communication system. Specifically, it is possible to efficiently transmit/receive uplink signals in inter-site CA.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incor

FIG. 2 illustrates the structure of a radio frame.

BEST MODE

The following description of embodiments of the present invention may apply to various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA and employs OFDMA in downlink and SC-FDMA in uplink. LTE-A (LTE-Advanced) is an evolved version of 3GPP LTE.

For clarity, the following description mainly concerns 3GPP LTE system or 3GPP LTE-A system, by which the technical idea of the present invention may be non-limited. And, specific terminologies used in the following description are provided to help the present invention to be understood. The specific terminologies can be modified into a different form within a range not deviating from a technical idea of the present invention.

The terms used in the specification will now be described.

HARQ-ACK (Hybrid Automatic Repeat request-Acknowledgement): this represents an acknowledgment response to downlink transmission, that is, an ACK/NACK(Negative ACK)/DTX (Discontinuous Transmission) response (simply, ACK/NACK (response), ACK/NAK (response), A/N (response)). The ACK/NACK response refers to ACK, NACK, DTX or NACK/DTX. Downlink transmission that requires HARQ-ACK feedback includes transmission of a PDSCH (Physical Downlink shared Channel) and transmission of an SPS release PDCCH (Semi-Persistent Scheduling release Physical Downlink Control channel).

HARQ-ACK corresponding to a cell (or CC (Component Carrier)): this represents an ACK/NACK response to downlink transmission scheduled for the corresponding cell.

PDSCH: this includes a PDSCH corresponding to a DL grant PDCCH and an SPS (Semi-Persistent Scheduling) PDSCH. The PDSCH can be replaced by a transport block or a codeword.

SPS PDSCH: this refers to a PDSCH transmitted using a resource semi-statically set according to SPS. The SPS PDSCH has no DL grant PDCCH corresponding thereto. The SPS PDSCH is used interchangeably with a PDSCH w/o (without) PDCCH.

SPS release PDCCH: this refers to a PDCCH indicating SPS release. A UE feeds back ACK/NACK information about an SPS release PDCCH.

Figure 1A:
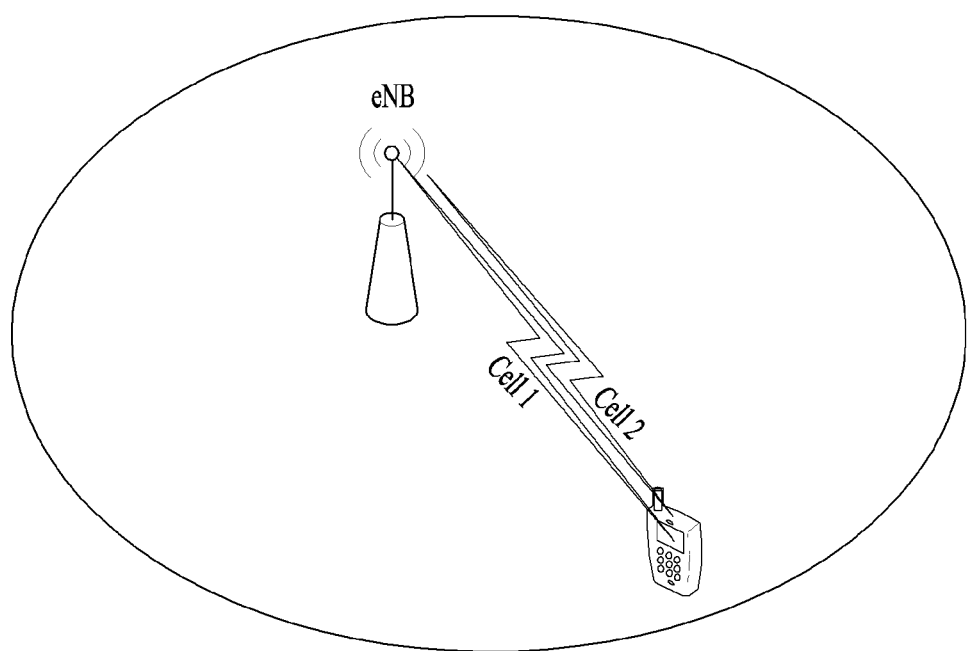
- FIGS. 1A and 1B illustrate a carrier aggregation (CA)-based wireless communication system.
Figure 1B:
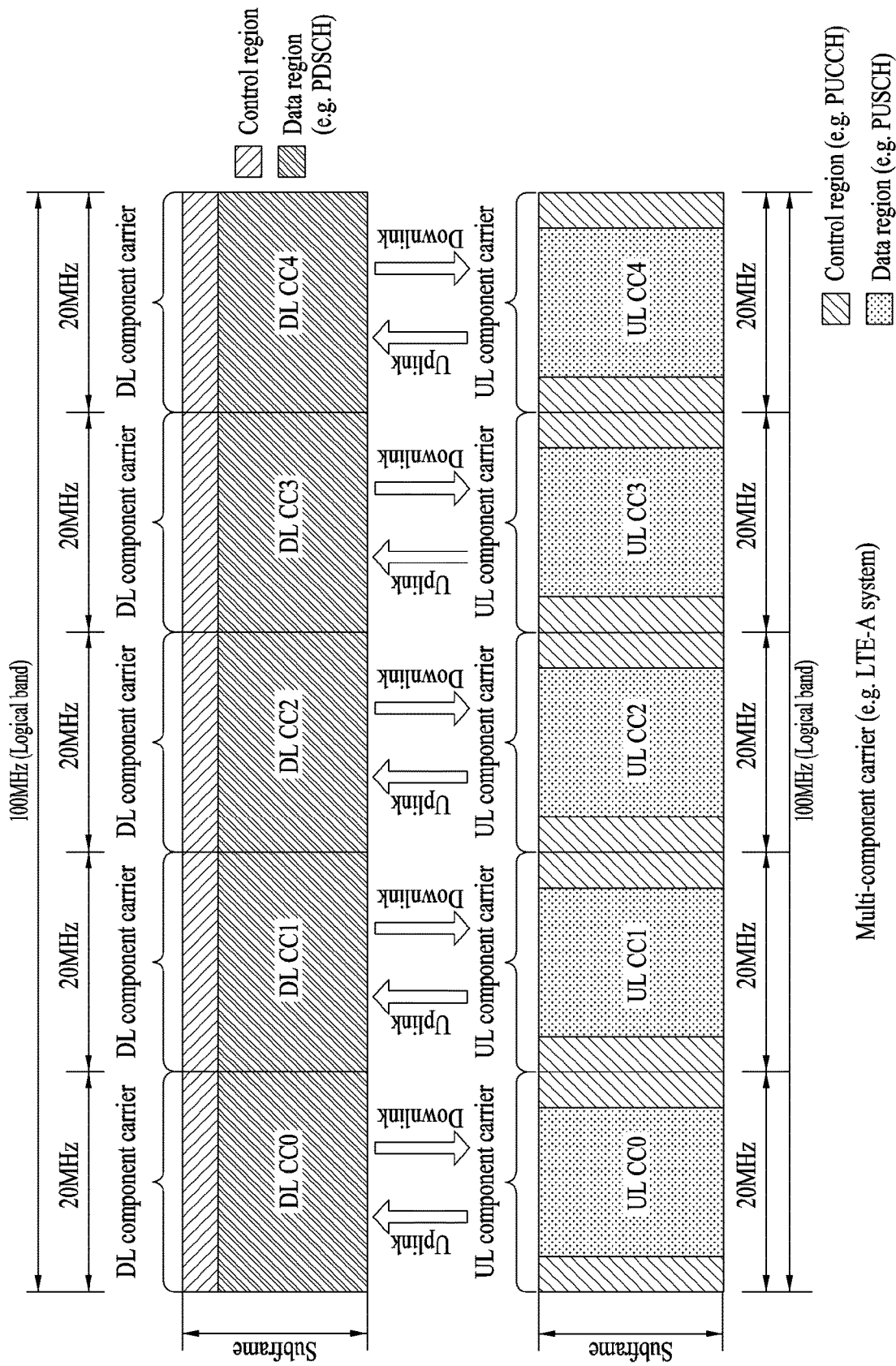

FIGS. 1A and 1B illustrate a conventional carrier aggregation (CA)-based wireless communication system. LTE supports only one DL/UL frequency block, whereas LTE-A provides a wider frequency band by aggregating a plurality of UL/DL frequency blocks. Each frequency block is transmitted using a component carrier (CC). A CC refers to a carrier frequency (or center carrier or center frequency) of a frequency block.

Referring to FIGS. 1A and 1B, a plurality of DL/UL CCs managed by one eNB can be aggregated for one UE. CCs may be contiguous or non-contiguous. The bandwidth of each CC can be independently determined. Asymmetrical carrier aggregation in which the number of UL CCs differs from the number of DL CCs is possible. Even when the entire system bandwidth corresponds to N CCs, a frequency band that can be used by a specific UE can be limited to L (<N) CCs. Various parameters with respect to carrier aggregation can be set cell-specifically, UE group-specifically or UE-specifically. Control information can be set such that the control information is transmitted and received only through a specific CC. Such specific CC may be referred to as a primary CC (PCC) (or anchor CC) and the remaining CCs may be referred to as secondary CCs (SCCs). Since UCI is transmitted only on the PCC, a plurality of PUCCHs is not transmitted through a plurality of UL CCs and transmission of a plurality of PUCCHs on the PCC is not permitted for UE power management. Accordingly, only one PUCCH can be transmitted in one UL subframe in a conventional CA system.

LTE(-A) uses the concept of the cell for radio resource management. The cell is defined as a combination of DL resources and UL resources. The UL resources are not mandatory. Accordingly, the cell can be composed of DL resources only or DL resources and UL resources. When carrier aggregation is supported, linkage between a carrier frequency of a DL resource (or DL CC) and a carrier frequency of a UL resource (or UL CC) can be indicated by system information. A cell operating at a primary frequency (or on a PCC) may be referred to as a primary cell (PCell) and a cell operating at a secondary frequency (or on an SCC)

may be referred to as a secondary cell (SCell). The PCell is used to perform initial radio resource control connection establishment or RRC connection re-configuration. The PCell may refer to a cell indicated during a handover procedure. The SCell can be configured after RRC (Radio Resource Control) connection can be established between an eNB and a UE and used to provide additional radio resources. The PCell and the SCell may be commonly called a serving cell.

Unless separately mentioned, the following description may be applied to each of a plurality of aggregated CCs (or cells). In addition, a CC in the following description may be replaced with a serving CC, serving carrier, cell, serving cell, etc.

FIG. 2 illustrates the structure of a radio frame.

FIG. 2(a) illustrates the structure of a type-1 radio frame for frequency division duplex (FDD). A radio frame includes a plurality of (e.g., 10) subframes, and each subframe includes a plurality of (e.g., 2) slots in the time domain. Each subframe may have a length of 1 ms and each slot may have a length of 0.5 ms. A slot includes a plurality of OFDM/SC-FDMA symbols in the time domain and includes a plurality of resource blocks (RBs) in the frequency domain.

FIG. 2(b) illustrates the structure of a type-2 radio frame for time division duplex (TDD). The type-2 radio frame includes 2 half frames, and each half frame includes 5 subframes. One subframe includes 2 slots.

Table 1 shows uplink-downlink configurations (UL-DL Cfgs) of subframes in a radio frame in a TDD mode. UD-cfg is signaled through system information (e.g., a system information block (SIB)). For convenience, UD-cfg, which is set through the SIB for a TDD cell, is referred to as SIB-cfg.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a DL subframe, U denotes a UL subframe, and S denotes a special subframe. The special subframe includes a downlink pilot time slot (DwPTS), a guard period (GP), and an uplink pilot time slot (UpPTS). The DwPTS is a time period reserved for downlink transmission and the UpPTS is a time period reserved for uplink transmission.

Figure 3:
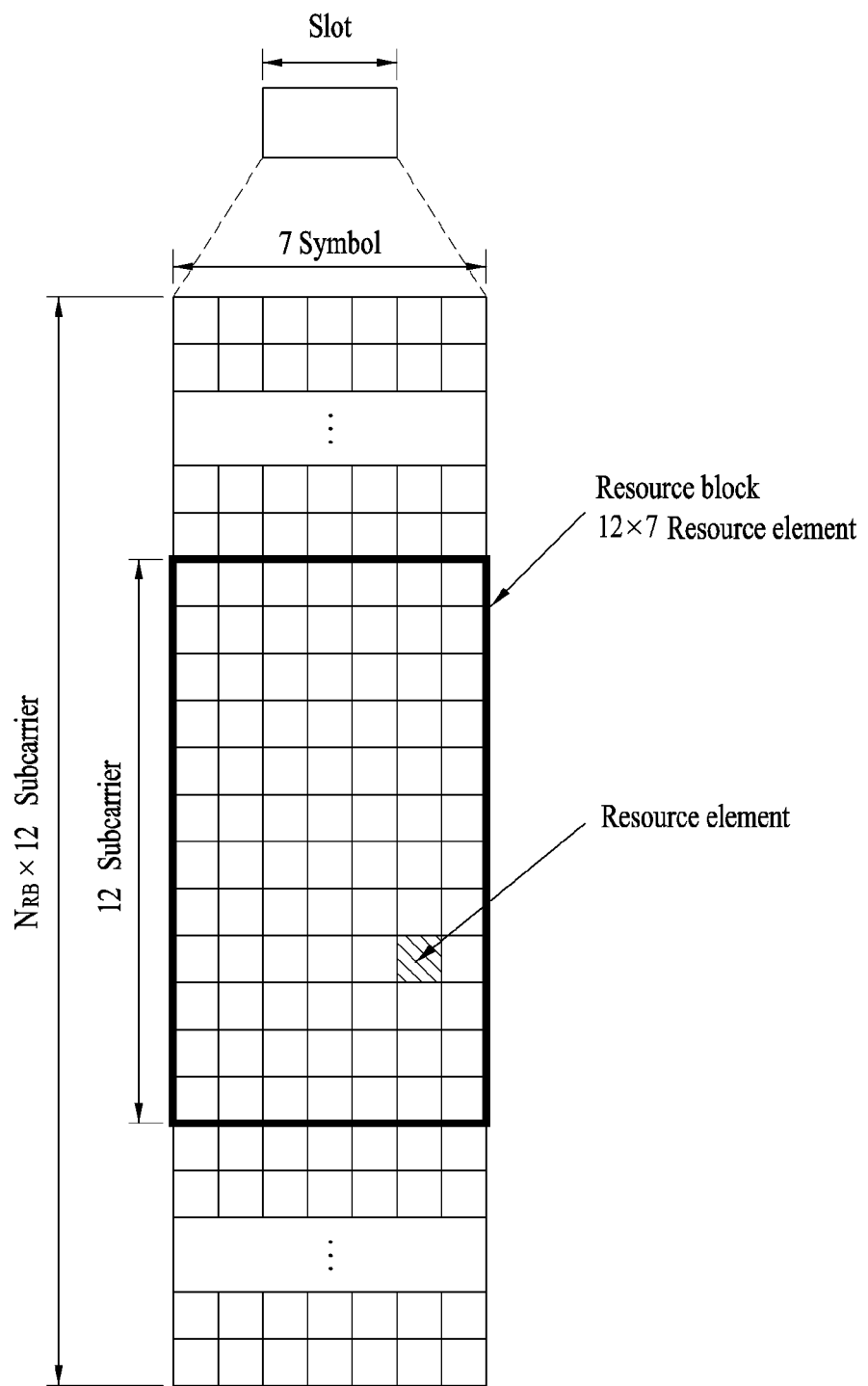
FIG. 3 illustrates a resource grid of a downlink (DL) slot.

FIG. 3 illustrates a resource grid of a DL slot.

Referring to FIG. 3, a DL slot includes a plurality of OFDMA (or OFDM) symbols in the time domain. One DL slot may include 7(6) OFDMA symbols, and one resource block (RB) may include 12 subcarriers in the frequency domain. Each element on the resource grid is referred to as a resource element (RE). One RB includes 12×7(6) REs. The number $N^{RB}$ of RBs included in the DL slot depends on a downlink transmit bandwidth. The structure of a UL slot may be same as that of the DL slot except that OFDMA symbols are replaced by SC-FDMA symbols.

Figure 4:
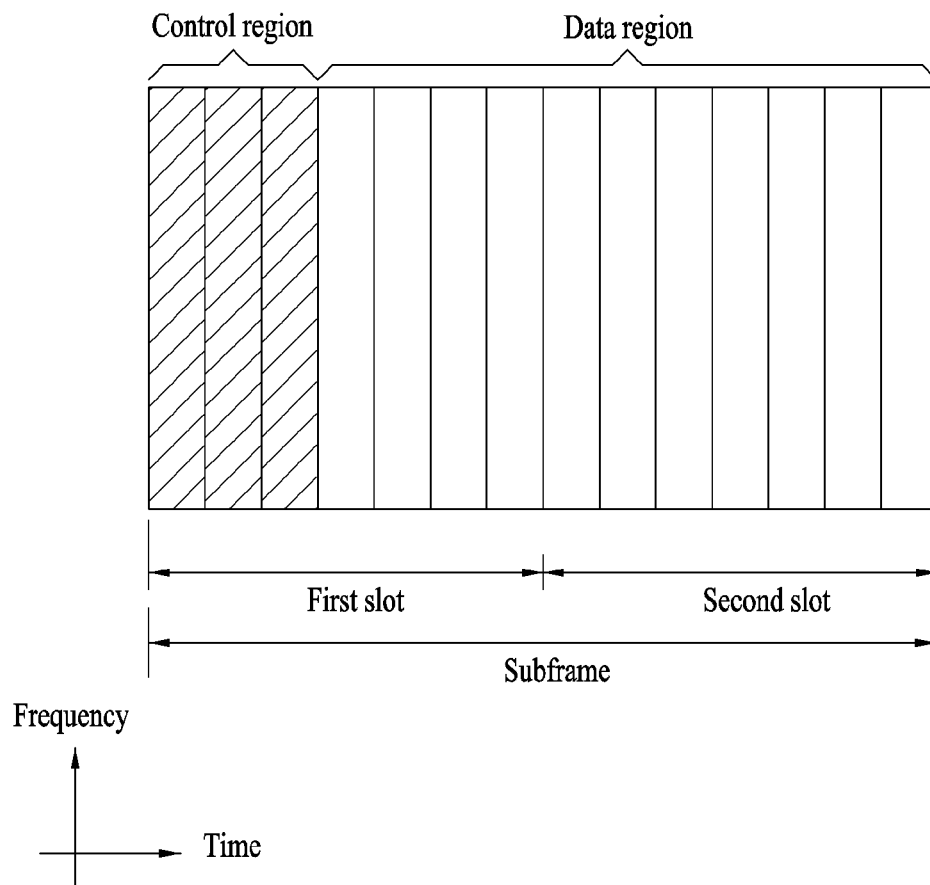
FIG. 4 illustrates the structure of a DL subframe.

FIG. 4 illustrates the structure of a DL subframe.

Referring to FIG. 4, up to 3(4) OFDMA symbols located in a front portion of a first slot within a subframe correspond to a control region to which a control channel is allocated. The remaining OFDMA symbols correspond to a data region to which a physical downlink shared chancel (PDSCH) is allocated. Examples of downlink control channels include a physical control format indicator channel (PCFICH), a physical downlink control channel (PDCCH), a physical HARQ indicator channel (PHICH), etc. The PCFICH is transmitted at a first OFDM symbol of a subframe and carries information regarding the number of OFDMA symbols used for transmission of control channels within the subframe. The PHICH is a response to uplink transmission and carries a HARQ acknowledgement (ACK)/negative acknowledgement (NACK) signal.

A PDCCH may carry a transmission format and resource allocation information of a downlink shared channel (DL-SCH), a transmission format and resource allocation information of an uplink shared channel (UL-SCH), paging information on a paging channel (PCH), system information on the DL-SCH, resource allocation information of an upper-layer control message such as a random access response transmitted on the PDSCH, a set of Tx power control commands on individual UEs within an arbitrary UE group, a Tx power control command, information on activation of a voice over IP (VoIP), etc.

Downlink control information (DCI) is transmitted on a PDCCH. DCI formats 0/4 (hereinafter referred to as UL DCI formats) are defined for UL scheduling (or UL grant), and DCI format 1/1A/1B/1C/1D/2/2A/2B/2C (hereinafter referred to as DL DCI format) is defined for DL scheduling. The DCI format selectively includes information such as a hopping flag, RB allocation information, modulation and coding scheme (MCS), redundancy version (RV), new data indicator (NDI), transmit power control (TPC), demodulation reference signal (DMRS) cyclic shift, depending on its use. In addition, DCI format 3/3A (referred to as TPC DCI format hereinafter) is defined for uplink signal power control. The TPC DCI format includes bitmap information for a plurality of UEs, and 2-bit information (DCI format 3) or 1-bit information (DCI format 3A) in the bitmap indicates a TPC command for a PUCCH and a PUSCH of a corresponding UE.

A plurality of PDCCHs may be transmitted within a control region. A UE may monitor the PDCCHs in every subframe to check a PDCCH designated to the UE. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). A PDCCH coding rate may be controlled according to the number of CCEs (i.e., CCE aggregation level) used for PDCCH transmission. The CCE includes a plurality of resource element groups (REGs). A format of the PDCCH and the number of PDCCH bits are determined according to the number of CCEs. A BS determines a PDCCH format according to DCI to be transmitted to the UE, and attaches a cyclic redundancy check (CRC) to control information. The CRC is masked with an identifier (e.g., radio network temporary identifier (RNTI)) according to an owner or usage of the PDCCH. If the PDCCH is for a specific UE, an identifier (e.g., cell-RNTI (C-RNTI)) of the UE may be masked to the CRC. Alternatively, if the PDCCH is for a paging message, a paging identifier (e.g., paging-RNTI (P-RNTI)) may be masked to the CRC. If the PDCCH is for system information (more specifically, a system information block (SIB)), a system information RNTI (SI-RNTI) may be masked to the CRC. When the PDCCH is for a random access response, a random access-RNTI (RA-RNTI) may be masked to the CRC.

Figure 5:
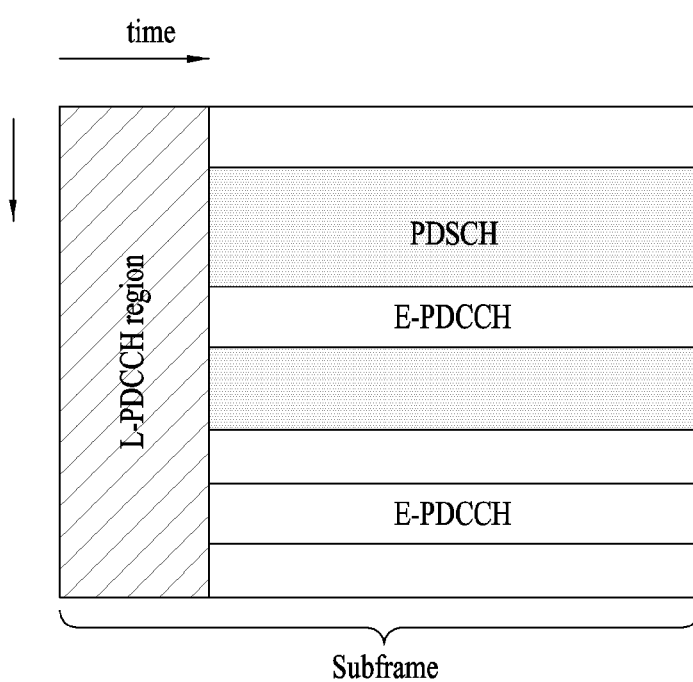
FIG. 5 illustrates an example of Enhanced Physical Downlink Control Channel (EPDCCH).

FIG. 5 illustrates an EPDCCH. The EPDCCH is a channel additionally introduced in LTE-A.

Referring to FIG. 5, a PDCCH (for convenience, legacy PDCCH or L-PDCCH) according to legacy LTE/LTE-A may be allocated to a control region (see FIG. 4) of a subframe. In the figure, the L-PDCCH region means a region to which a legacy PDCCH may be allocated. Meanwhile, a PDCCH may be further allocated to the data region (e.g., a resource region for a PDSCH). A PDCCH allocated to the data region is referred to as an E-PDCCH. As shown, control channel resources may be further acquired via the E-PDCCH to mitigate a scheduling restriction due to restricted control channel resources of the L-PDCCH region. Similarly to the L-PDCCH, the E-PDCCH carries DCI. For example, the E-PDCCH may carry downlink scheduling information and uplink scheduling information. For example, the UE may receive the E-PDCCH and receive data/control information via a PDSCH corresponding to the E-PDCCH. In addition, the UE may receive the E-PDCCH and transmit data/control information via a PUSCH corresponding to the E-PDCCH. The E-PDCCH/PDSCH may be allocated starting from a first OFDM symbol of the subframe, according to cell type.

Then, a description is now given of scheduling when a plurality of CCs (or cells) are configured. If a plurality of CCs are configured, cross-carrier scheduling scheme and non-cross-carrier scheduling (or self scheduling) scheme may be used. The non-cross-carrier scheduling (or self scheduling) scheme is the same as the legacy LTE scheduling scheme.

If cross-carrier scheduling is configured, a DL grant PDCCH may be transmitted in DL CC #0, and a corresponding PDSCH may be transmitted in DL CC #2. Likewise, a UL grant PDCCH may be transmitted in DL CC #0, and a corresponding physical uplink shared channel (PUSCH) may be transmitted in UL CC #4. For cross-carrier scheduling, a carrier indicator field (CIF) is used. Whether a CIF is present in a PDCCH may be determined through higher layer signaling (e.g., RRC signaling) using semi-static and UE-specific (or UE-group-specific) schemes.

Scheduling according to whether a CIF is set may be defined as described below.

CIF disabled: A PDCCH in a DL CC allocates PDSCH resources in the same DL CC or allocates PUSCH resources in one linked UL CC.

CIF enabled: A PDCCH in a DL CC may allocate PDSCH or PUSCH resources in a specific DL/UL CC among a plurality of aggregated DL/UL CCs, using a CIF.

When a CIF is present, a BS may allocate one or more PDCCH monitoring DL CCs (hereinafter referred to as monitoring CCs (MCCs)) to a UE. The UE may detect/decode a PDCCH in the MCCs. That is, if the BS schedules a PDSCH/PUSCH to the UE, a PDCCH is transmitted only in the MCCs. The MCCs may be set using UE-specific, UE-group-specific, or cell-specific scheme. The MCCs include a PCC.

Figure 6:
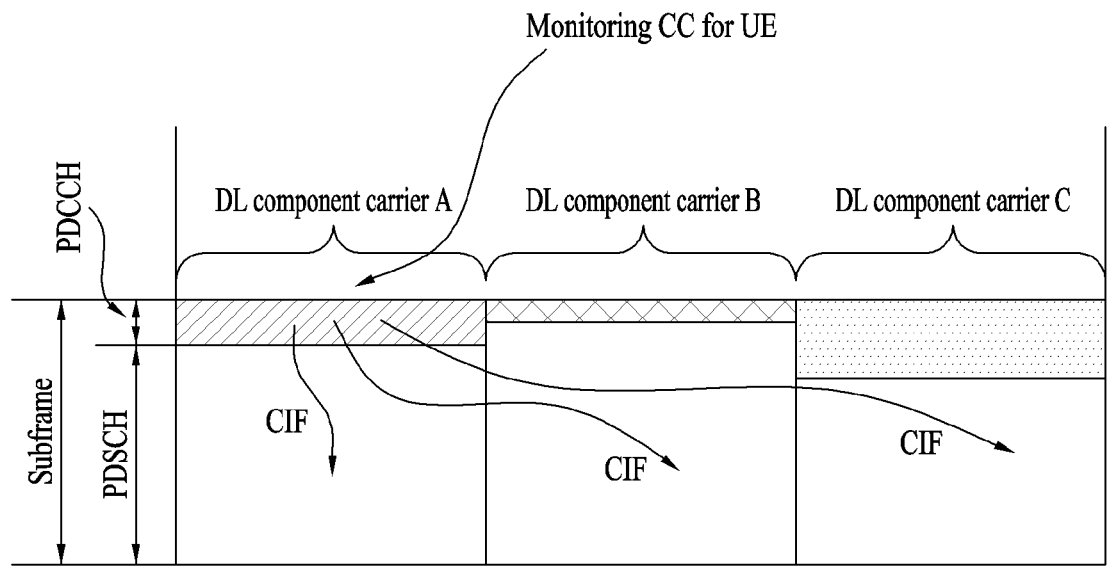
FIG. 6 illustrates a scheduling method when a plurality of cells is configured.

FIG. 6 illustrates cross-carrier scheduling. Although DL scheduling is illustrated in FIG. 5, the illustrated scheme is equally applied to UL scheduling.

Referring to FIG. 6, 3 DL CCs may be configured for a UE, and DL CC A may be set as a PDCCH monitoring DL CC (i.e., MCC). If a CIF is disabled, each DL CC may transmit a PDCCH for scheduling its PDSCH without the CIF according to the LTE PDCCH rules. On the other hand, if a CIF is enabled, DL CC A (i.e., MCC) may transmit not only a PDCCH for scheduling its PDSCH but also PDCCHs for scheduling PDSCHs of other CCs, using the CIF. In this example, DL CC B/C transmits no PDCCH.

Figure 7:
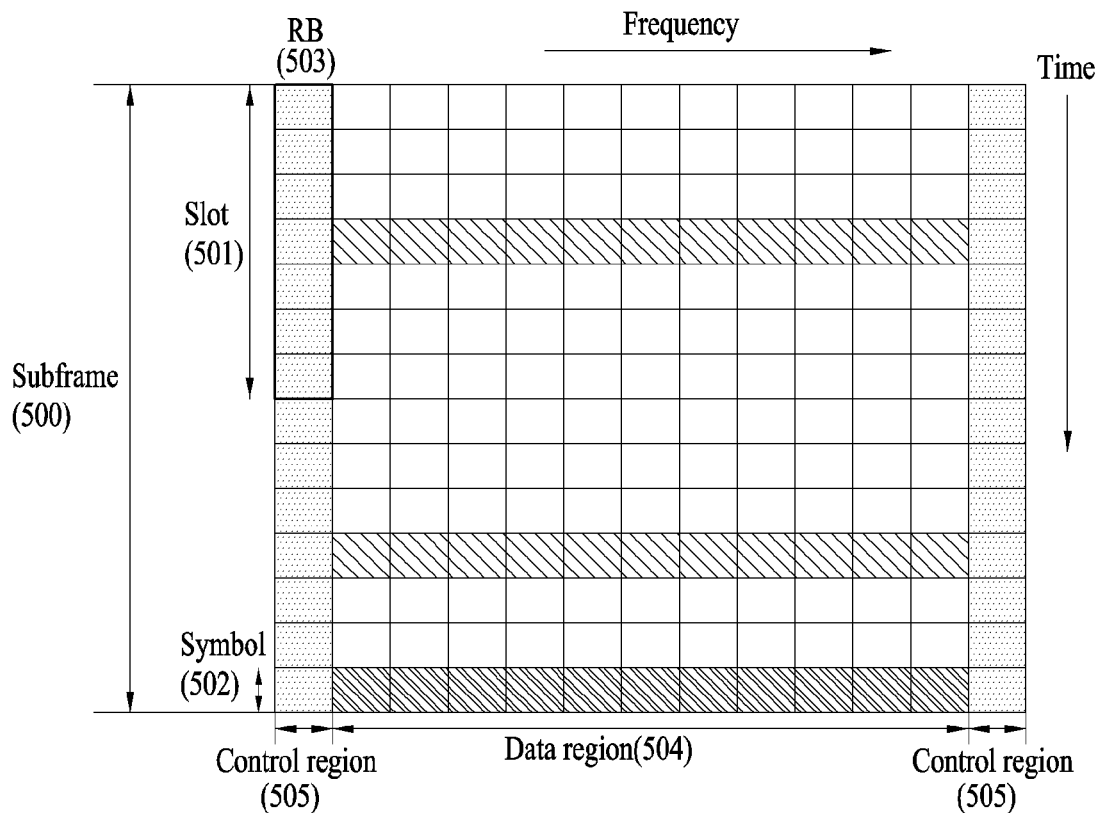
FIG. 7 illustrates the structure of an uplink subframe.

FIG. 7 is a diagram showing the structure of an uplink subframe.

Referring to FIG. 7, a subframe having a length of 1 ms includes two of slots each having a length of 0.5 ms. The slot may include SC-FDMA symbols, the number of which is changed according to CP length. For example, the slot includes seven SC-FDMA symbols in a normal CP case and includes six SC-FDMA symbols in an extended CP case. A resource block 503 is a resource allocation unit corresponding to 12 subcarriers in a frequency domain and one slot in a time domain. The structure of the uplink subframe may be divided into a control region 504 and a data region 505. The data region includes a PUSCH and is used to transmit a data signal such as voice. The control region includes a PUCCH and is used to transmit uplink control information (UCI). The PUCCH includes an RB pair located at both ends of the data region on a frequency axis and is hopped at a slot boundary. An SRS (Sounding Reference Signal) is transmitted on the last SC-FDMA symbol of the subframe. The SRS may be transmitted periodically or aperiodically at the request of an eNB. Periodic SRS transmission is defined by a cell-specific parameter and a UE-specific parameter. The cell-specific parameter indicates all subframe sets (referred to as cell-specific SRS subframe sets hereinafter) in which the SRS can be transmitted in a cell and the UE-specific parameter indicates a subframe sub-set (referred to as a UE-specific SRS subframe set hereinafter) that is actually allocated to a UE within all subframe sets.

The PUCCH can be used to transmit the following control information.

SR (scheduling request): This is information used to request UL-SCH resources and is transmitted using on-off keying (OOK) scheme.

HARQ-ACK: This is a response signal to a downlink signal (e.g., PDSCH, SPS release PDCCH). For example, 1-bit ACK/NACK is transmitted as a response to one DL codeword and 2-bit ACK/NACK is transmitted as a response to two DL codewords.

CSI (Channel Status Information): This is feedback information on a DL channel and includes channel quality information (CQI), rank indicator (RI), precoding matrix indicator (PMI), precoding type indicator (PTI), etc. Here, the CSI refers to periodic CSI (p-CSI). Aperiodic CSI (aperiodic CSI (a-CSI)) transmitted at the request of an eNB is transmitted on a PUSCH.

Table 2 shows the mapping relationship between a PUCCH format (PF) and UCI in LTE(-A).

TABLE 2

| PUCCH format | Uplink Control Information (UCI) |
| --- | --- |
| Format 1 | SR (scheduling request) (unmodulated waveform) |
| Format 1a | 1-bit HARQ-ACK/NACK (with/without SR) |
| Format 1b | 2-bit HARQ-ACK/NACK (with/without SR) |
| Format 2 | CSI (20 coded bits) |
| Format 2 | CSI and 1-bit or 2-bit HARQ-ACK/NACK (20 bits) (for extended CP only) |
| Format 2a | CSI and 1-bit HARQ-ACK/NACK (20 + 1 coded bits) |
| Format 2b | CSI and 2-bit HARQ-ACK/NACK (20 + 2 coded bits) |
| Format 3 (LTE-A) | Up to 24 bits of HARQ-ACK/NACK + SR |

Figure 8:
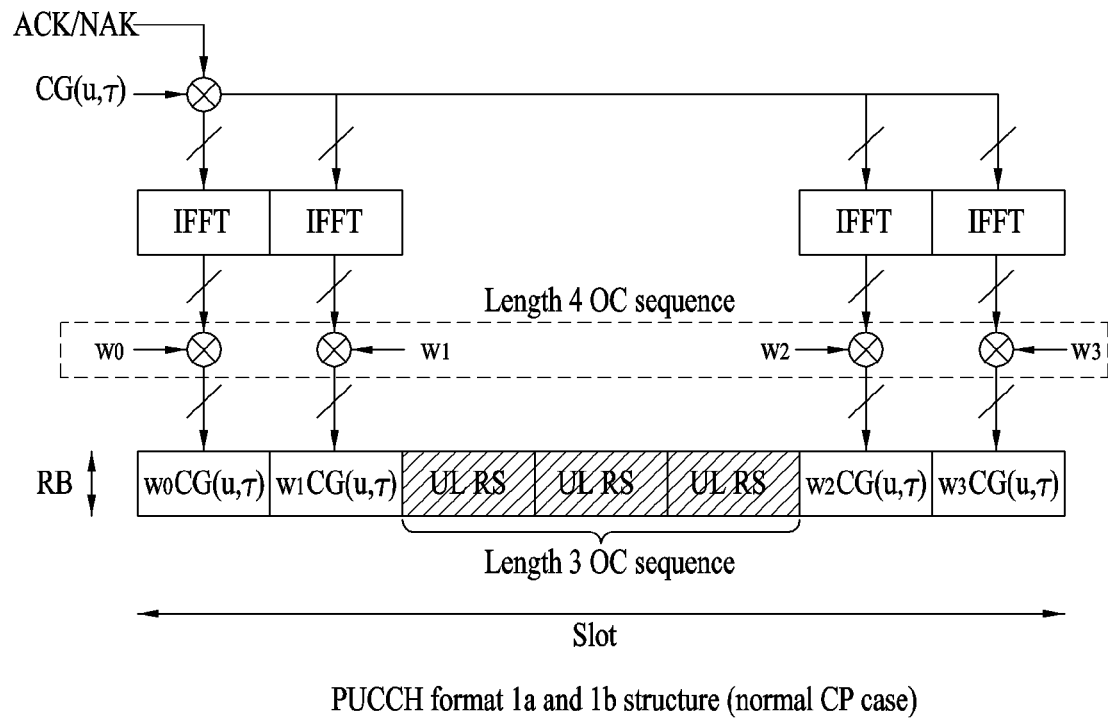
FIG. 8 illustrates the structures of physical uplink control channel (PUCCH) formats 1a and 1b in a slot level.

FIG. 8 illustrates the structures of PUCCH formats 1a and 1b in a slot level. In PUCCH formats 1a and 1b, the same control information is repeated on a slot basis in a subframe. Each UE transmits an ACK/NACK signal in different resources configured by a different cyclic shift (CS) (frequency-domain code) and a different orthogonal cover code (OCC) (time-domain spreading code) of a computer-generated constant amplitude zero auto correlation (CG-CAZAC) sequence. An OCC includes a Walsh/DFT orthogonal code. If the number of CSs is 6 and the number of OCs is 3, ACK/NACK signals of 18 UEs may be multiplexed into the same physical resource block (PRB). In PUCCH format 1, ACK/NACK in PUCCH format 1a/1 is replaced by an SR.

Figure 9:
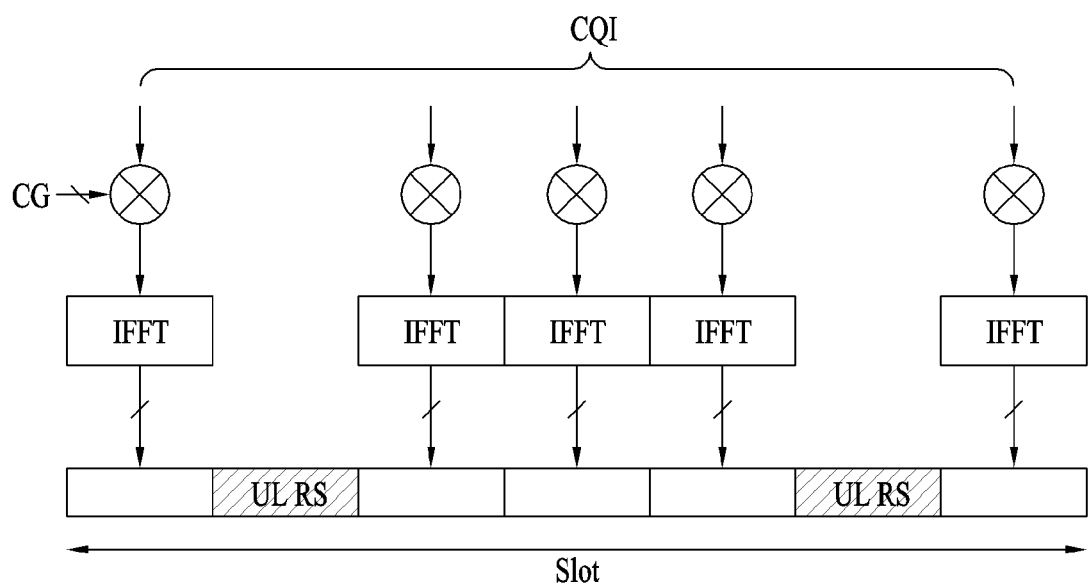
FIG. 9 is a diagram showing a slot level structure of PUCCH format 2.

FIG. 9 is a diagram showing PUCCH format 2.

Referring to FIG. 9, if a normal CP is configured, PUCCH format 2/2a/2b includes five QPSK data symbols and two RS symbols at a slot level. If an extended CP is configured, PUCCH format 2/2a/2b includes five QPSK data symbols and one RS symbol at a slot level. If an extended CP is configured, an RS symbol is located at a fourth SC-FDMA symbol of each slot. Accordingly, PUCCH format 2/2a/2b may carry a total of 10 QPSK data symbols. Each QPSK symbol is spread in the frequency domain by a CS and then is mapped to an SC-FDMA symbol. The RS may be multiplexed by code division multiplexing (CDM) using a CS. A/N transmission and CSI transmission may be required in the same subframe. In this case, when a higher layer sets non-permission of A/N+CSI simultaneous transmission ("Simultaneous-A/N-and-CQI" parameter=OFF), only A/N transmission is performed using PUCCH format 1a/1b and CSI transmission is dropped. Conversely, when permission of A/N+CQI simultaneous transmission is set ("Simultaneous-AN-and-CQI" parameter=ON), A/N and CSI are transmitted together through PUCCH format 2/2a/2b. Specifically, in the case of normal CP, A/N is embedded in the second RS of each slot (e.g., A/N is multiplied by the RS) in PUCCH format 2a/2b. In the case of an extended CP, A/N and CSI are joint-coded and then transmitted through PUCCH format 2.

Figure 10:
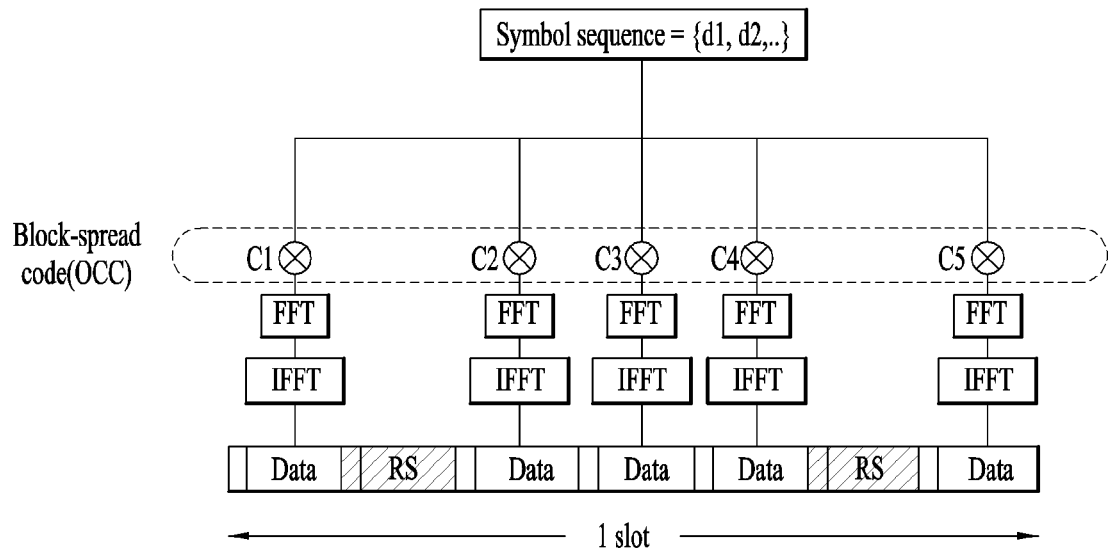
FIG. 10 illustrates the structure of PUCCH format 3 in a slot level.

FIG. 10 illustrates the structure of PUCCH format 3 in a slot level. PUCCH format 3 is used to transmit a plurality of pieces of ACK/NACK information, and information such as CSI and/or SR may be transmitted together.

Referring to FIG. 10, one symbol sequence is transmitted over the frequency domain, and OCC-based time-domain spreading is applied to the symbol sequence. Control signals of a plurality of UEs may be multiplexed into the same RB using OCCs. Specifically, 5 SC-FDMA symbols (i.e. a UCI data part) are generated from one symbol sequence {d1, d2, ... } using a length-5 OCC. Here, the symbol sequence {d1, d2, ... } may be a modulation symbol sequence or a codeword bit sequence. The symbol sequence {d1, d2, ... } may be generated by performing joint coding (e.g., Reed-Muller coding, tail-biting convolutional coding, etc.), block-spreading, and SC-FDMA modulation on a plurality of pieces of ACK/NACK information.

Figure 11:
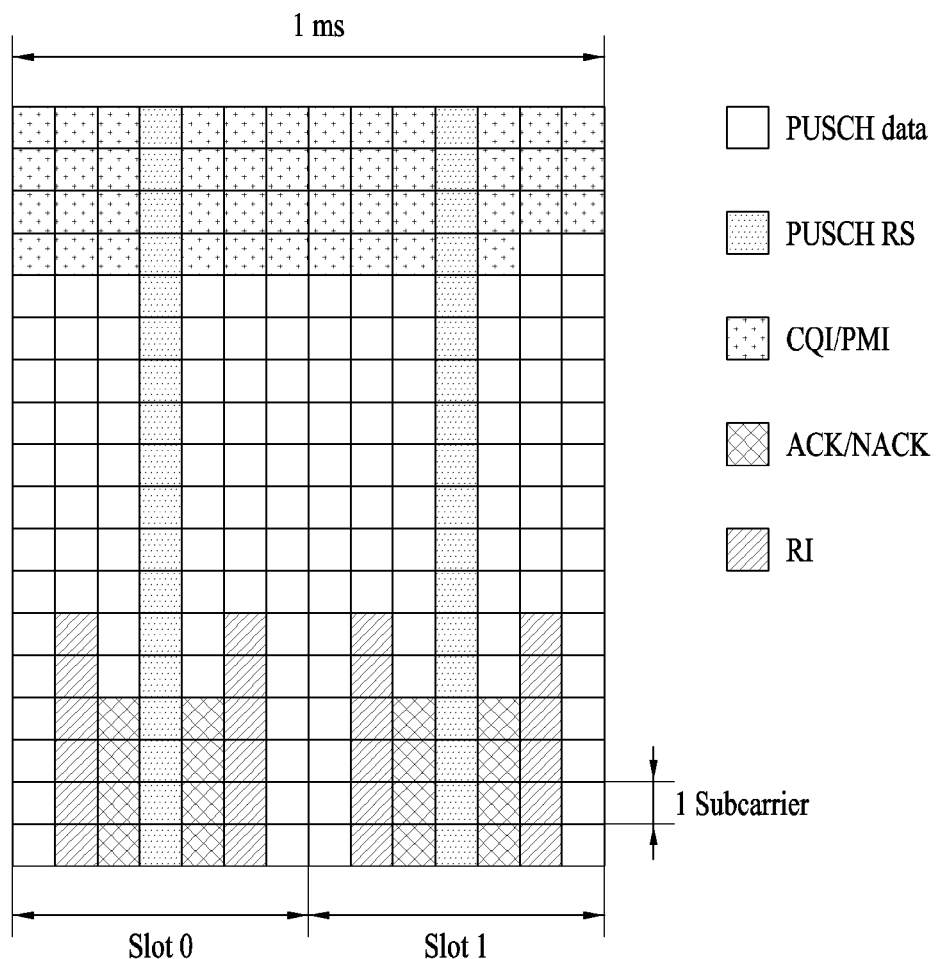
FIG. 11 illustrates a method for transmitting uplink control information (UCI) on a physical uplink shared channel (PUSCH).

FIG. 11 illustrates a method for transmitting UCI on a PUSCH. A subframe which requires UCI transmission has PUSCH assignment, UCI may be transmitted on a PUSCH (PUSCH piggyback). Specifically, for piggybacking of CSI/PMI and RI, PUSCH data (i.e., UL-SCH data) information (e.g., a coded symbol) is rate-matched in consideration of the quantity of the CSI/PMI and RI. Meanwhile, ACK/NACK is inserted into part of SC-FMDA resources to which the UL-SCH data is mapped through puncturing. UCI can be scheduled to be transmitted on a PUSCH without the UL-SCH data.

When a UE needs to transmit a PUCCH in a cell-specific SRS subframe set, the UE does not use the last SC-FDMA symbol of the second slot to transmit the PUCCH in order to protect the SRS thereof/SRSs of other UEs. For convenience, a PUCCH format in which all SC-FDMA symbols of a subframe are used for PUCCH transmission is referred to as a normal PUCCH format and a PUCCH format in which the last SC-FDMA symbol of the second slot is not used for PUCCH transmission is referred to as a shortened PUCCH format. For the same reason, when a PUSCH is allocated to a cell-specific SRS subframe, each UE does not use the last SC-FDMA symbol of the second slot for PUSCH transmission. Specifically, PUSCH data (i.e. UL-SCH data) information (e.g., coded symbol) is rate-matched in consideration of the quantity of a resource of the last SC-FDMA symbol. For convenience, a PUSCH, which is transmitted using all SC-FDMA symbols of a subframe, is referred to as a normal PUSCH and a PUSCH, which is transmitted without using the last SC-FDMA symbol of the second slot, is referred to as a rate-matched PUSCH.

Figure 12:
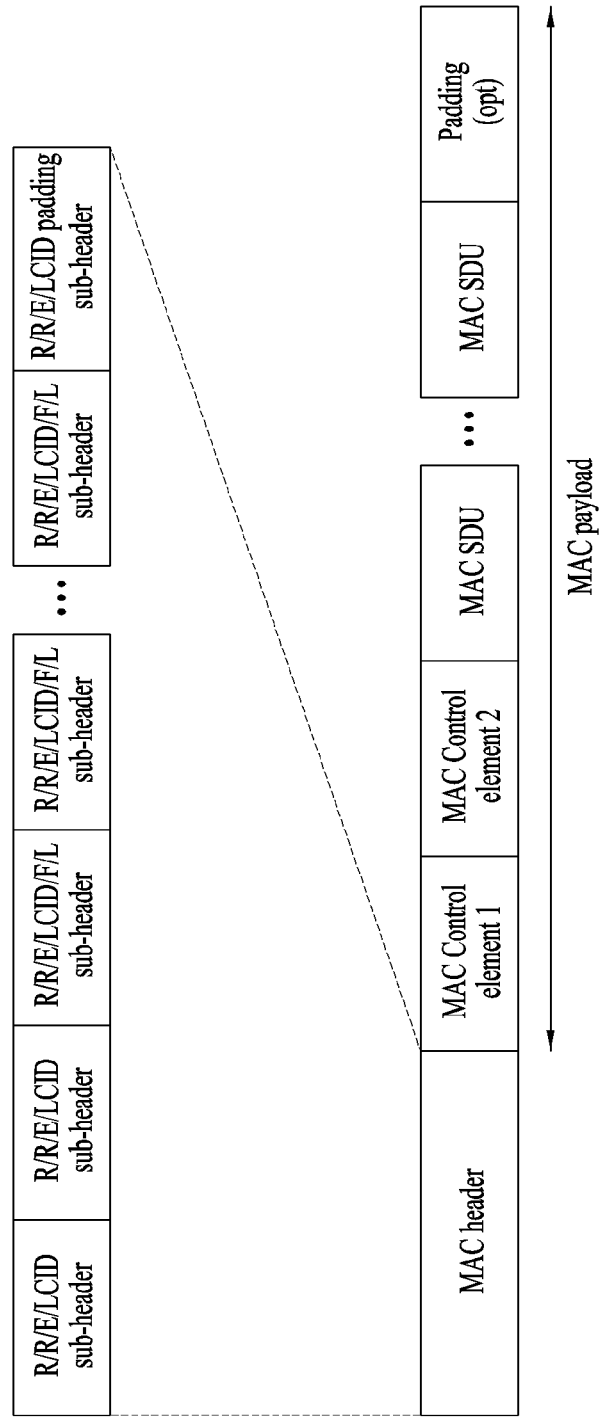
FIG. 12 is a diagram showing a medium access control protocol data unit (MAC PDU).

FIG. 12 is a diagram showing a medium access control protocol data unit (MAC PDU). The MAC PDU is transmitted via a downlink shared channel (DL-SCH) and an uplink shared channel (UL-SCH).

Referring to FIG. 12, the MAC PDU includes a MAC header, 0 or more MAC service data units (SDUs) and 0 or more MAC control elements (CEs). A MAC PDU subheader has the same order as the MAC SDU and MAC CE corresponding thereto. The MAC CE is located in front of the MAC SDU. The MAC CE is used to carry a variety of MAC control information. For example, the MAC CE includes SCell activation/deactivation information, TAC information, buffer status report (BSR) information and power headroom report (PHR) information.

Figures 13, 14:
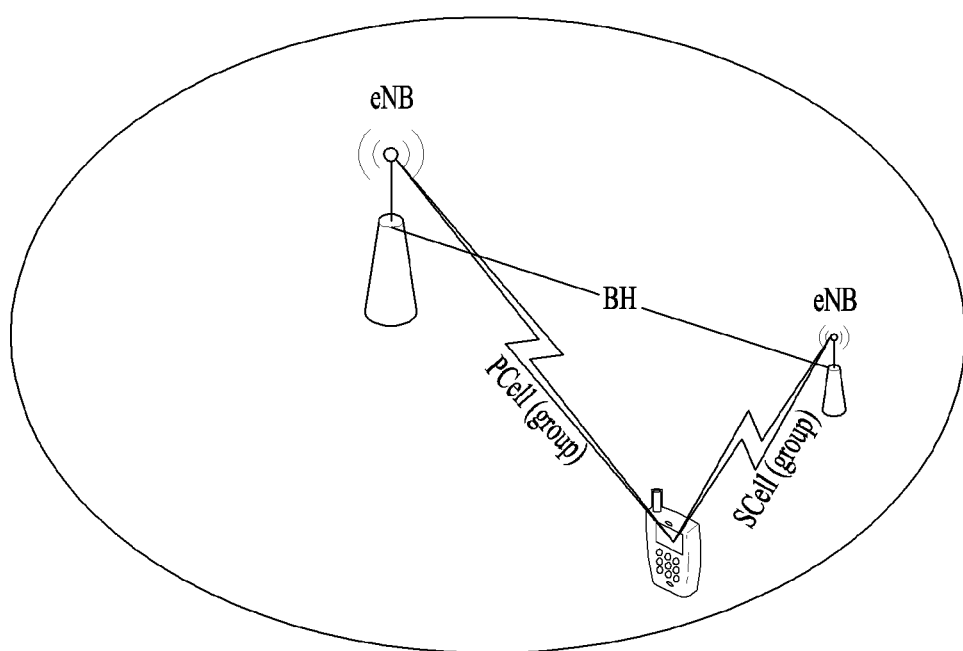
FIG. 13 is a diagram showing a power headroom report (PHR) MAC CE.
FIG. 14 is a diagram showing inter-site carrier aggregation (CA).

FIG. 13 is a diagram showing a power headroom report (PHR) MAC CE. FIG. 13 shows an extended PH MAC CE and may notify the UE of a PH for aggregated all cells. The field of the PH MAC CE will now be described.

$C_i$: Indicates whether a PH field for an SCell having ScellIndex i is present. The $C_i$ field is set to 1 if the PH field for the SCell having ScellIndex i is reported and, otherwise, is set to 0.

R: Reserved bit. This is set to 0.

V: Indicates whether the PH value is based on actual transmission or reference format.

PH: Indicates a power headroom level.

P: Indicates whether the UE applies power backoff for power management.

$P_{CMAC,c}$: Indicates information about per-cell maximum power used to calculate the value of the above-described PH field.

Embodiment: Power adjustment in inter-site CA

In LTE-A, assume that aggregation (that is, CA) of a plurality of cells is supported and a plurality of cells aggregated for one UE is managed by one eNB (intra-site CA) (see, FIG. 1). In intra-site CA, since all cells are managed by one eNB, signaling related to various RRC configurations/reports and MAC commands/messages may be performed via any one of all aggregated cells. For example, signaling involved in a procedure of adding or releasing a specific SCell to or from a CA cell set, a procedure of changing a transmission mode (TM) of a specific cell, a procedure of performing radio resource management (RRM) measurement reporting associated with a specific cell, etc. may be performed via any cell of the CA cell set. As another example, signaling involved in a procedure of activating/deactivating a specific SCell, a buffer status report for UL buffer management, etc. may be performed via any cell of the CA cell set. As another example, a per-cell power headroom report (PHR) for UL power control, a per-timing advanced group (TAG) timing advance command (TAC) for UL synchronization control, etc. may be signaled via any cell of the CA cell set.

Meanwhile, in a next-generation system subsequent to LTE-A, a plurality of cells (e.g., micro cells) having small coverage may be deployed in a cell (e.g., a macro cell) having large coverage, for traffic optimization. For example, a macro cell and a micro cell may be aggregated for one UE, the macro cell may be mainly used for mobility management (e.g., PCell) and the micro cell may be mainly used for throughput boosting (e.g., SCell). In this case, the cells aggregated for one UE may have different coverages and may be respectively managed by different eNBs (or nodes (e.g., relays) corresponding thereto) which are geographically separated from each other (inter-site CA).

FIG. 14 is a diagram showing inter-site carrier aggregation (CA). Referring to FIG. 14, a method for performing radio resource control and management for a UE (e.g., all functions of RRC and some functions of MAC) at an eNB for managing a PCell (e.g., CC1) and performing data scheduling and feedback with respect to each cell (that is, CC1 or CC2) (e.g., all functions of PHY and main functions of MAC) at each eNB for managing each cell may be considered. Accordingly, in inter-site CA, information/data exchange/delivery between cells (that is, between eNBs) is required. Upon considering a conventional signaling method, in inter-site CA, information/data exchange/delivery between cells (that is, between eNBs) may be performed via a backhaul (BH) link (e.g., a wired X2 interface or a wireless backhaul link). However, when the conventional method is applied without change, cell management stability, resource control efficiency and data transmission adaptation, etc. may be considerably reduced due to latency caused in an inter-eNB signaling procedure.

For example, as shown in FIG. 14, an inter-site CA situation in which a PCell (e.g., CC1) (group) and an SCell (e.g., CC2) (group) aggregated for one UE are respectively managed by eNB-1 and eNB-2 is assumed. In addition, assume that the eNB (that is, eNB-1) for managing the PCell is responsible for managing/performing an RRC function associated with the UE corresponding thereto. At this time, if a radio resource management (RRM) measurement (e.g., reference signal received power (RSRP), reference signal received quality (RSRQ)) report associated with the SCell is not transmitted by the PCell but is transmitted via the SCell (e.g., a PUSCH), eNB-2 may deliver the RRM measurement report to eNB-1 via the BH. In addition, based on the RRM report, for example, if eNB-1 sends an RRC reconfiguration command for releasing the SCell from the CA cell set to the UE via the PCell (e.g., a PDSCH), the UE may transmit a confirmation response to the RRC reconfiguration command via the SCell (e.g., a PUSCH) instead of the PCell. In this case, eNB-2 may deliver the confirmation response to eNB-1 via the BH, etc. Accordingly, in inter-site CA, considerable latency may be caused in an inter-cell (that is, inter-eNB) signaling procedure. Thus, misalignment between the eNB and the UE for CA cell set interpretation may occur and stable/efficient cell resource management and control may not be facilitated.

As another example, in the same inter-site CA situation, per-cell PHRs of all cells may be transmitted via the PCell (e.g., the PUSCH). In this case, eNB-1 (for managing the PCell) may deliver the PHR corresponding to all PHRs or a PHR corresponding to the SCell to eNB-2 (for managing the SCell) via the BH, etc. In contrast, if per-cell PHRs of all cells are transmitted via the SCell, eNB-2 may deliver all PHRs or a PHR corresponding to the PCell to eNB-1 via the BH, etc. Even at this time, stable/efficient UL power control and adaptive UL data scheduling/transmission based thereon may not be facilitated due to latency caused by inter-eNB signaling.

Accordingly, in inter-site CA, DL/UL data scheduling and UCI (e.g., ACK/NACK, CSI and SR) transmission may be performed per cell (group) belonging to the same eNB. For example, on the assumption that a PCell and an SCell, which are aggregated for one UE, respectively belong to eNB-1 and eNB-2, a DL/UL grant, which schedules DL/UL data transmitted through the PCell, and ACK/NACK feedback for the DL/UL data can be transmitted through the PCell, and a DL/UL grant, which schedules DL/UL data transmitted through the SCell, and ACK/NACK feedback for the DL/UL data can be transmitted through the SCell. In addition, aperiodic CSI (a-CSI)/periodic CSI (p-CSI) reports and SR signaling with respect to the PCell can be transmitted through the PCell, whereas CSI report and SR signaling with respect to the SCell can be transmitted through the SCell. Accordingly, simultaneous transmission of PUCCHs in a plurality of cells needs to be performed/permitted in inter-site CA (or similar CA structure), distinguished from the conventional technology. However, permission of simultaneous PUCCH transmission in multiple cells may deteriorate single carrier property of UL signals according to state/conditions (e.g. hardware and location) of the UE so as to cause UL performance loss.

Therefore, the present invention provides setting of whether simultaneous transmission of multiple PUCCHs is permitted through higher layer signaling (e.g. RRC signaling). Here, simultaneous transmission of multiple PUCCHs includes simultaneous transmission of multiple PUCCHs in multiple cells (i.e. simultaneous transmission of PUCCHs for respective cells). For convenience, a parameter that indicates whether simultaneous transmission of PUCCHs is permitted is defined as "multi-PUCCH". When the multi-PUCCH is set to ON, a UE can perform simultaneous transmission of multiple PUCCHs within one UL subframe. When the multi-PUCCH is set to OFF, the UE cannot perform simultaneous transmission of multiple PUCCHs within one UL subframe. That is, when the multi-PUCCH is OFF, simultaneous transmission of multiple PUCCHs within one UL subframe is not permitted and only transmission of a single PUCCH can be permitted in one UL subframe (in a single cell).

In the meantime, it is possible to set whether to permit (i) simultaneous transmission of periodic CSI and a period/aperiodic SRS in different cells, (ii) simultaneous transmission of periodic CSI and aperiodic CSI in different cells, (iii) simultaneous transmission of multiple aperiodic CSIs in different cells and/or (iv) simultaneous transmission of an SR and a periodic/aperiodic SRS in different cells, through higher layer signaling (e.g. RRC signaling). In addition, whether to permit simultaneous transmission of HARQ-ACK and a periodic/aperiodic SRS in different cells can be set through higher layer signaling (e.g. RRC signaling).

Furthermore, whether to permit simultaneous transmission of an SRS and UCI can be independently set per cell (group) through higher layer signaling (e.g., RRC signaling). The shortened PUCCH format can be used when simultaneous transmission of the SRS and UCI is permitted, whereas the normal PUCCH format can be used when simultaneous transmission of the SRS and UCI is not permitted.

Meanwhile, an additional UE operation/procedure may be needed in order to support setting of multi-PUCCH ON/OFF in inter-site CA (or similar CA structure). For example, multiple PUCCHs can be simultaneously transmitted in one UL subframe in the case of multi-PUCCH ON. In the case of maximum power limitation (e.g., when UE transmit power exceeds a UE maximum power limit), appropriate UL power adjustment is necessary for the plurality of PUCCHs. Furthermore, since only one PUCCH can be transmitted in one UL subframe in the case of multi-PUCCH OFF, PUCCH transmissions for respective cells need to be performed at different timings. Accordingly, UCI (e.g. ACK/NACK) transmission timing per cell needs to be changed. A description will be given of a UL power control method for inter-site CA and multi-PUCCH ON/OFF state (or similar structure).

To aid in understanding of the present invention, it is assumed that two cell groups are aggregated for one UE. For example, it is assumed that cell group 1 and cell group 2 are aggregated for one UE. Here, a cell group includes one or more cells. Accordingly, a cell group can be composed of only one cell or a plurality of cells. Respectively cell groups may belong to different eNBs. Specifically, a PCell group and an SCell group can be aggregated for one UE, the PCell group can belong to eNB-1 (e.g. macro eNB) and the SCell group can belong to eNB-2 (e.g. micro eNB). The PCell group refers to a cell group including a PCell. The PCell group is composed of the PCell alone or includes the PCell and one or more SCells. The SCell group refers to a cell group composed of SCells only and includes one or more SCells. However, this is exemplary and the present invention can be equally/similarly applied to a case in which three or more cell groups (e.g. one PCell group and two or more SCell groups) are aggregated for one UE.

In addition, the present invention provides a UL power control method when multiple cell groups are aggregated for one UE and multiple UL transmissions (e.g. transmissions of UCI, PUCCH, PUSCH, PRACH, SRS and the like) are performed in the multiple cell groups. Accordingly, although the following description focuses on a case in which multiple cell groups belonging to different eNBs are aggregated for one UE, this is exemplary and the present invention can also be equally/similarly applied to a case in which multiple cell groups belonging to one eNB are aggregated for one UE.

When a PCell group and an SCell group are aggregated for one UE, a PUCCH may be transmitted through a PCell in the PCell group and the PUCCH may be transmitted through a specific SCell in the SCell group. For convenience, the SCell configured to transmit the PUCCH in the SCell group is referred to as an ACell. Here, (i) the PCell group and the SCell group may belong to different eNBs (e.g. PCell—macro eNB, SCell—micro eNB) or (ii) the PCell group and the SCell group may belong to the same eNB.

When A/N transmission using a PUCCH through the ACell is set, a specific PUCCH parameter and DCI signaling in association with EPDCCH-based scheduling may need to be provided to the ACell. Accordingly, the present invention proposes setting of the starting index of implicit PUCCH resources linked to an EPDCCH set (ECCE resources constituting the same) or a PUCCH index offset by which the starting index can be inferred, for an EPDCCH set configured in the ACell (distinguished from a conventional scheme in which the starting index or the PUCCH index offset is set only for an EPDCCH set configured in the PCell).

Furthermore, the present invention proposes provision/activation of signaling information (e.g. TPC/ARO/ARI values), which is necessary to control/determine an A/N transmission PUCCH resource through a specific field (e.g. TPC/ARO) within a DL grant EPDCCH, even for a DL grant EPDCCH corresponding/transmitted to/in the ACell. Specifically, information signaled through the TPC/ARO field within the DL grant EPDCCH can be configured per cell according to frame structure type (FDD or TDD) and A/N feedback transmission method (PF3 or CHsel) as follows. Here, an SCell can refer to a normal SCell other than the PCell and the ACell.

1) FDD with PF3
  A. TPC field
    i. DL grant that schedules the PCell or ACell: TPC value
    ii. DL grant that schedules the SCell: ARI value
  B. ARO field
    i. DL grant that schedules the PCell or ACell: ARO value
    ii. DL grant that schedules the SCell: fixed value
2) FDD with CHsel
  A. TPC field
    i. DL grant that schedules the PCell or ACell: TPC value
    ii. DL grant that schedules the SCell: ARI value
  B. ARO field
    i. DL grant transmitted through the PCell or ACell: ARO value
    ii. DL grant transmitted through the SCell: fixed value
3) TDD with PF3
  A. TPC field
    i. DL grant that schedules the PCell or ACell: TPC value
    ii. DL grant that schedules the SCell: ARI value
  B. ARO field
    i. DL grant scheduling the PCell or ACell and corresponding to DAI=1: ARO value
    ii. DL grant that schedules the PCell or ACell and does not correspond to DAI=1: ARI value
    iii. DL grant that schedules the SCell: fixed value
4) TDD with CHsel
  A. TPC field
    i. DL grant that schedules the PCell or ACell: TPC value
    ii. DL grant that schedules the SCell: ARI value
  B. ARO field
    i. DL grant transmitted through the PCell or ACell: ARO value
    ii. DL grant transmitted through the SCell: fixed value When A/N feedback for an arbitrary cell group is configured to be transmitted through a specific ACell (here, the cell group can include the ACell), ARIs (to be applied to the same A/N transmission timing) signaled through all DL grant EPDCCHs and/or all DL grant PDCCHs (scheduling the corresponding cell group and/or transmitted through the corresponding cell group) for the corresponding cell group may have the same value. That is, a UE can operate on the assumption that ARIs in all DL grant PDCCHs have the same value. Here, an ARI can have an independent value per cell group. For example, an ARI with respect to a cell group to which a PCell belongs and an ARI with respect to a cell group to which an ACell belongs can have the same value or different values (for the same A/N transmission timing).

A description will be given of a power control method when multiple UL transmissions are performed in multiple cells (groups). In the following description, a cell can be extended to a cell group.

Figure 15:
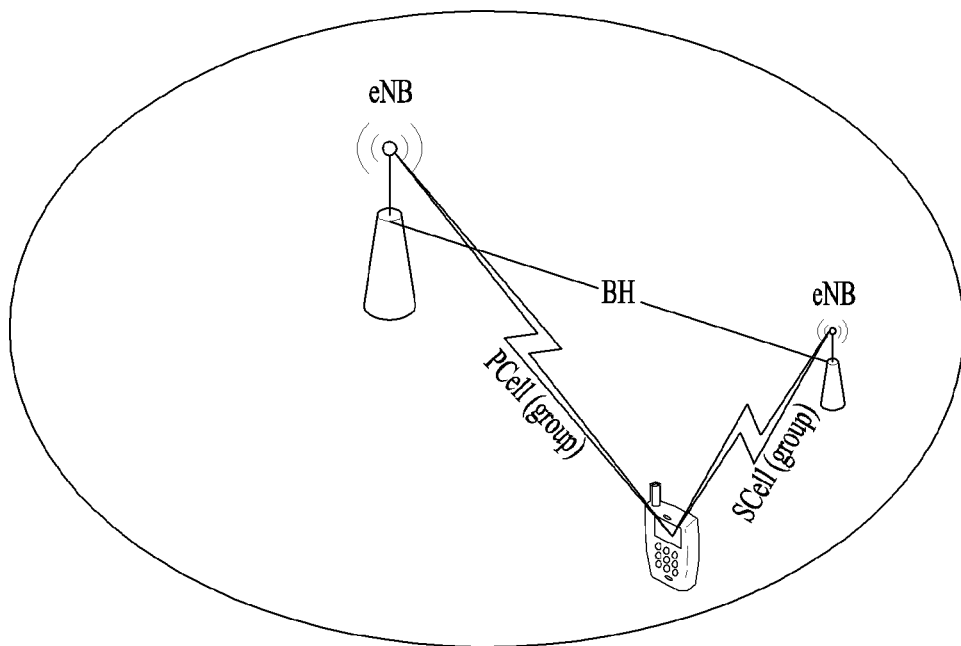
FIG. 15 illustrates UL power control according to an embodiment of the present invention.

FIG. 15 illustrates a UL power control method according to an embodiment of the present invention. Referring to FIG. 15, in the case of simultaneous UL transmissions in a PCell (group) and an SCell (group) and maximum power limitation, power for the UL transmission(s) in the PCell (group) and/or the SCell (group) may be controlled or the UL transmission(s) may be dropped. Specifically, transmission timings of the following channels/UCI can overlap in one UL subframe. Here, "PUCCH with X" refers to a PUCCH on which UCI X is transmitted and "PUSCH with Y" refers to a PUSCH on which UCI Y is piggybacked. "Z+W" refers to a case in which UCI Z and UCI W are transmitted together.

1) PUCCH with A/N
2) PUCCH with p-CSI
3) PUCCH with SR
4) PUCCH with A/N+p-CSI
5) PUCCH with A/N+SR
6) PUCCH with A/N+p-CSI+SR
7) PUSCH with A/N
8) PUSCH with p-CSI
9) PUSCH with a-CSI
10) PUSCH with A/N+p-CSI
11) PUSCH with A/N+a-CSI The present invention proposes channel/UCI protection priority for determining a channel/UCI for which power is reduced or transmission is dropped in a maximum power limitation situation. UE maximum power (referred to as $P_{max,UE}$ hereinafter), cell group maximum power (referred to as $P_{max,cgp}$ hereinafter), cell maximum power (referred to as $P_{max,c}$ hereinafter) can be set for one UE. Maximum power limitation can occur when transmit power of a corresponding channel/UCI exceeds any one of the UE maximum power ($P_{max,UE}$), cell group maximum power ($P_{max,cgp}$) and cell maximum power ($P_{max,c}$). When such maximum powers are set, a UL power adjustment procedure can include 1) adjusting the sum of channel/signal transmit powers within one cell to be less than the cell maximum power ($P_{max,c}$) per cell, 2) adjusting the sum of channel/signal transmit powers within one cell group to be less than the cell group maximum power ($P_{max,cgp}$) per cell group, and then 3) adjusting the sum of channel/signal transmit powers within all cells (cell groups) to be less than the UE maximum power ($P_{max,UE}$).

In this case, the UE can perform the UL power adjustment procedure in such a manner that the UE reduces power or drops transmission for a channel/UCI having lower protection priority. To reduce transmit power of a channel/UCI having lower protection priority, various methods can be used. For example, when transmit power of a channel/UCI having higher protection priority is $P_A$ and transmit power of a channel/UCI having lower protection priority is $P_B$, if a situation in which $P_A+P_B>P_{max,UE}$ occurs, the UE can reduce $P_B$ to $P_B'$ or 0. $P_B'$ may be $\alpha*P_B$, $P_B-\beta$ or $\alpha*P_B\pm\beta$. Here, the unit of power may be a linear-scale value or log-scale, $0\leq\alpha<1$ and $\beta$ is a positive real number. For example, $\alpha$ that satisfies $P_A+\alpha*P_B\leq P_{max,UE}$ can be determined. In the following description, priority indicates channel/UCI protection priority unless otherwise mentioned.

<Collision Between PUCCHs>

In the present invention, priority can refer to 1) channel/UCI protection priority for determining a channel/UCI for which power is reduced or transmission is dropped in a maximum power limitation situation when multi-PUCCH ON is set for a UE having capability of simultaneously transmitting multiple PUCCHs (on multiple cells/carriers) or 2) channel/UCI protection priority for determining a channel/UCI for which transmission is dropped when multi-PUCCH OFF is set for a UE having capability of simultaneously transmitting multiple PUCCHs or in the case of a UE having no capability of simultaneously transmitting multiple PUCCHs.

A. Rule 1-1: UCI Priority

UCI priority can be determined as A/N>SR>p-CSI or A/N=SR>p-CSI. When multiple UCIs are transmitted on one PUCCH, power adjustment/transmission drop can be determined on the basis of priority of highest priority UCI. Specifically, when multiple PUCCHs need to be simultaneously transmitted in one UL subframe, power reduction or transmission drop can be preferentially applied to a low-priority PUCCH on the basis of the highest priority UCI. When PUCCHs have the same priority on the basis of the highest priority UCIs, power(s) for the PUCCH(s) can be reduced at the same rate (e.g. equal scaling), or power reduction or transmission drop can be applied to a low-priority PUCCH on the basis of second (or additionally third) highest priority UCI. When different numbers of UCIs are transmitted on PUCCHs and first and/or second highest priority UCI have the same priority, power reduction or transmission drop can be preferentially applied to a PUCCH corresponding to a small number of UCIs. For example, priority can be applied in the order of (A/N+p-CSI+SR)> (A/N+SR)>(A/N+p-CSI)>A/N>=SR>p-CSI.

B. Rule 1-2: Power Level

Power reduction or transmission drop may be preferentially applied to a PUCCH having a high power value, or power reduction or transmission drop may be preferentially applied to a PUCCH having a low power value. Otherwise, power reduction or transmission drop may be preferentially applied to a PUCCH of a cell (or cell group) having a high maximum power limit, or power reduction or transmission drop may be preferentially applied to a PUCCH of a cell (or cell group) having a low maximum power limit.

Rule 1-3: PUCCH Format

Priority of PUCCH format 3 may be set higher than those of other PUCCH formats (e.g. 2/2a/2b, 1/1a/1b). In addition, priority of PUCCH format 1 series (e.g., 1/1a/1b) may be set higher than that of PUCCH format 2 series (e.g., 2/2a/2b). Further, priority of PUCCH formats (e.g., 1/1a/1b, 2a/2b) in which A/N or an SR is transmitted may be set higher than that of a PUCCH format (e.g., 2) in which only CSI is transmitted. Priority of PUCCH format 2 series (e.g., 2a/2b) in which CSI and A/N are simultaneously transmitted may be set higher than that of PUCCH format 1 series (e.g. 1/1a/1b) in which A/N and/or an SR are transmitted. In addition, priority of the shortened PUCCH format configured/used to transmit/protect an SRS (for the same PUCCH format) may be set higher than that of the normal PUCCH format or priority of the normal PUCCH format may be set higher than that of the shortened PUCCH format.

Rule 1-4: UCI Size

Power reduction or transmission drop may be preferentially applied to a PUCCH on which a small number of UCI bits or a small number of A/N (and/or SR) bits is transmitted. In addition, power reduction or transmission drop may be preferentially applied to a PUCCH on which A/N corresponding to a small number of cells or a small number TBs (Transport Blocks) is transmitted.

Rule 1-5: CSI Type/Size

Power reduction or transmission drop may be preferentially applied to a PUCCH on which a low priority CSI type is transmitted. CSI type priority may conform to CSI types 3, 5, 6 and 2a>CSI types 2, 2b, 2c and 4>CSI types 1 and 1a, for example. In addition, power reduction or transmission drop may be preferentially applied to a PUCCH used to transmit CSI for a small number of cells or a PUCCH used to transmit CSI for a low priority cell. Cell priority may be predetermined or set through RRC signaling and the like. Information fed back according to CSI type is as follows.

CSI type 1: CQI for a UE-selected subband
CSI type 1a: subband CQI and second PMI (Precoding Matrix Index)
CSI type 2, 2b, 2c: wideband CQI and PMI.
CSI type 2a: wideband PMI
CSI type 3: RI (Rank Indicator).
CSI type 4: wideband CQI
CSI type 5: RI and wideband PMI
CSI type 6: RI and PTI (Precoding Type Indicator).

Rule 1-6: FDD vs. TDD

Priority of a PUCCH transmitted through an FDD cell can be set higher than that of a PUCCH transmitted through a TDD cell. Conversely, priority of a PUCCH transmitted through a TDD cell can be set higher than that of a PUCCH transmitted through an FDD cell.

Rule 1-7: CP Length

Priority of a PUCCH transmitted through a cell set to the extended CP may be set higher than that of a PUCCH transmitted through a cell set to the normal CP. Conversely, priority of a PUCCH transmitted through a cell set to the normal CP may be set higher than that of a PUCCH transmitted through a cell set to the extended CP.

Rule 1-8: Cell Priority

Cell protection priority can be applied (when PUCCHs have the same UCI priority). The cell priority may be predetermined (e.g., PCell>SCell) or set through RRC signaling and the like. For example, when A/N transmission corresponding to DL data reception in a PCell (or a cell group to which the PCell belongs) collides with A/N transmission corresponding to DL data reception in an SCell (or a cell group consisting of only SCells) at the same timing, power can be reduced or transmission can be dropped for a PUCCH corresponding to SCell A/N.

An SR can be transmitted per cell (group), and a plurality of SRs transmitted through a plurality of cells (groups) can be configured 1) to have the same timing/period or 2) to respectively have independent timings/periods.

Rules 1-1 to 1-8 may be used alone or in combination. In this case, a rule or rule combination to be used may be predetermined or set through RRC signaling and the like.

<Collision Between PUSCHs>

In the present invention, priority can refer to 1) channel/UCI protection priority for determining a channel/UCI for which power is reduced or transmission is dropped by a UE having capability of simultaneously transmitting multiple PUSCHs (on multiple cells/carriers) in a maximum power limitation situation or 2) channel/UCI protection priority for determining a channel/UCI for which transmission is dropped in the case of a UE having no capability of simultaneously transmitting multiple PUSCHs.

Rule 2-1: UCI Priority

UCI priority can be determined as A/N>a-CSI>p-CSI or A/N>a-CSI=p-CSI. When multiple UCIs are transmitted on one PUSCH, power adjustment/transmission drop can be determined on the basis of priority of highest priority UCI. Specifically, when multiple PUSCHs need to be simultaneously transmitted in one UL subframe, power reduction or transmission drop can be preferentially applied to a low-priority PUCCH on the basis of the highest priority UCI.

When the highest priority UCIs have the same priority between PUSCHs, powers for the PUSCHs can be reduced at the same rate (e.g. equal scaling), or power reduction or transmission drop can be applied to a low-priority PUSCH on the basis of second (or additionally third) highest priority UCI. When different numbers of UCIs are transmitted on PUSCHs and first and/or second highest priority UCI have the same priority, power reduction or transmission drop can be preferentially applied to a PUSCH corresponding to a small number of UCIs. For example, priority can be applied in the order of (A/N+a-CSI)≥(A/N+p-CSI)>A/N>a-CSI)≥p-CSI.

Rule 2-2: Power Level

Power reduction or transmission drop may be preferentially applied to a PUSCH having a high power value, or power reduction or transmission drop may be preferentially applied to a PUSCH having a low power value. Otherwise, power reduction or transmission drop may be preferentially applied to a PUSCH of a cell (or cell group) having a high maximum power limit, or power reduction or transmission drop may be preferentially applied to a PUSCH of a cell (or cell group) having a low maximum power limit.

Rule 2-3: Rate-Matching

Priority of a PUSCH to which rate-matching is applied (for SRS transmission/protection) may be set higher than that of a PUSCH to which rate-matching is not applied, or priority of the PUSCH to which rate-matching is applied may be set lower than that of the PUSCH to which rate-matching is not applied.

Rule 2-4: UCI Size

Power reduction or transmission drop may be preferentially applied to a PUSCH on which a small number of UCI bits or a small number of A/N (and/or SR) bits is transmitted. In addition, power reduction or transmission drop may be preferentially applied to a PUSCH on which A/N corresponding to a small number of cells or a small number TBs (Transport Blocks) is transmitted.

Rule 2-5: CSI Type/Size

Power reduction or transmission drop may be preferentially applied to a PUSCH on which a low priority CSI type is transmitted. CSI type priority may conform to CSI types 3, 5, 6 and 2a>CSI types 2, 2b, 2c and 4>CSI types 1 and 1a, for example. In addition, power reduction or transmission drop may be preferentially applied to a PUSCH used to transmit CSI for a small number of cells or a PUSCH used to transmit CSI for a low priority cell. Cell priority may be predetermined or set through RRC signaling and the like.

Rule 2-6: FDD vs. TDD

Priority of a PUSCH transmitted through an FDD cell can be set higher than that of a PUSCH transmitted through a TDD cell. Conversely, priority of a PUSCH transmitted through a TDD cell can be set higher than that of a PUSCH transmitted through an FDD cell.

Rule 2-7: CP Length

Priority of a PUSCH transmitted through a cell set to the extended CP may be set higher than that of a PUSCH transmitted through a cell set to the normal CP. Conversely, priority of a PUSCH transmitted through a cell set to the normal CP may be set higher than that of a PUSCH transmitted through a cell set to the extended CP.

Rule 2-8: Cell Priority

Cell protection priority can be applied (when PUSCHs have the same UCI priority). The cell priority may be predetermined (e.g., PCell>SCell) or set through RRC signaling and the like. For example, when A/N transmission corresponding to DL data reception in a PCell (or a cell group to which the PCell belongs) collides with A/N transmission corresponding to DL data reception in an SCell (or a cell group consisting of only SCells) at the same timing, power can be reduced or transmission can be dropped for a PUSCH corresponding to SCell A/N.

When PUSCHs w/o UCI (i.e., PUSCHs transmitted without UCI piggybacking) collide, Rule 2-2 (power level), Rule 2-3 (rate-matching), Rule 2-6 (FDD vs. TDD) and/or Rule 2-7 (CP length) can be applied. In Rule 2-2, 2-3, 2-6 or 2-7, priority can be used to select a cell (in a specific cell group) or a PUSCH on which UCI for/corresponding to the specific cell group (composed of one or more cells) will be piggybacked.

Rules 2-1 to 2-8 may be used alone or in combination. In this case, a rule or rule combination to be used may be predetermined or set through RRC signaling and the like.

<Collision Between PUCCH/PUSCH>

In the present invention, priority can refer to 1) channel/UCI protection priority for determining a channel/UCI for which power is reduced or transmission is dropped in a maximum power limitation situation when simultaneous PUCCH/PUSCH transmission is set/permitted for a UE having capability of simultaneously transmitting a PUCCH/PUSCH (on multiple cells/carriers) or 2) channel/UCI protection priority for determining a channel/UCI for which transmission is dropped when simultaneous PUCCH/PUSCH transmission is not set/permitted for a UE having capability of simultaneously transmitting a PUCCH/PUSCH or in the case of a UE having no capability of simultaneously transmitting the PUCCH/PUSCH.

Rule 3-1: UCI/Channel Priority

UCI priority may conform to Rules 1-1 and 2-1 and channel priority may conform to PUCCH>PUSCH. The UCI priority may be applied first and then the channel priority may be applied. For example, power reduction or transmission drop can be preferentially applied to a PUSCH when UCI have the same priority or UCI transmitted on the PUSCH has lower priority, and power reduction or transmission drop can be preferentially applied to a PUCCH when UCI transmitted on the PUCCH has lower priority. As another example, the channel priority can conform to PUCCH<PUSCH. In this case, power reduction or transmission drop can be preferentially applied to a PUSCH when UCI transmitted on the PUSCH has lower protection priority, and power reduction or transmission drop can be preferentially applied to a PUCCH when UCI have the same priority or UCI transmitted on the PUCCH has lower protection priority.

Rule 3-2: Power Level

Power reduction or transmission drop may be preferentially applied to a channel having a high power value, or power reduction or transmission drop may be preferentially applied to a channel having a low power value. Otherwise, power reduction or transmission drop may be preferentially applied to a channel of a cell (or cell group) having a high maximum power limit, or power reduction or transmission drop may be preferentially applied to a channel of a cell (or cell group) having a low maximum power limit.

Rule 3-3: Channel Format

Priority of PUCCH format 3 may be set higher than that of a PUSCH. In addition, priority of a PUSCH with A/N may be set higher than that of PUCCH format 1 series (e.g., 1/1a/1b) and/or PUCCH format 2 series (e.g., 2/2a/2b). Furthermore, priority of PUCCH format 2 series (e.g., 2a/2b) in which CSI and A/N are simultaneously transmitted may be set higher than that of the PUSCH with A/N. Priority of a rate-matched PUSCH with A/N may be set higher than that of a PUCCH and/or priority of a non-rate-matched PUSCH with A/N may be set lower than that of a PUCCH (with A/N), and vice versa (i.e., non-rate-matched PUSCH with A/N>PUCCH and/or PUCCH (with A/N)>rate-matched PUSCH with A/N). Further, priority of a shortened PUCCH format with A/N may be set higher than that of a PUSCH and/or priority of a normal PUCCH format with A/N may be set lower than a PUSCH (with A/N), and vice versa (i.e., normal PUCCH format with A/N>PUSCH and/or PUSCH (with A/N)>shortened PUCCH format with A/N).

Rule 3-4: UCI Size

Power reduction or transmission drop may be preferentially applied to a channel on which a small number of UCI bits or a small number of A/N (and/or SR) bits is transmitted. In addition, power reduction or transmission drop may be preferentially applied to a channel on which A/N corresponding to a small number of cells or a small number TBs is transmitted.

Rule 3-5: CSI Type/Size

Power reduction or transmission drop may be preferentially applied to a channel on which a low priority CSI type is transmitted. CSI type priority may conform to CSI types 3, 5, 6 and 2a>CSI types 2, 2b, 2c and 4>CSI types 1 and 1a, for example. In addition, power reduction or transmission drop may be preferentially applied to a channel used to transmit CSI for a small number of cells or a channel used to transmit CSI for a low priority cell. Cell priority may be predetermined or set through RRC signaling and the like.

Rule 3-6: FDD vs. TDD

Priority of a channel transmitted through an FDD cell can be set higher than that of a channel transmitted through a TDD cell. Conversely, priority of a channel transmitted through a TDD cell can be set higher than that of a channel transmitted through an FDD cell.

Rule 3-7: CP Length

Priority of a channel transmitted through a cell set to the extended CP may be set higher than that of a channel transmitted through a cell set to the normal CP. Conversely, priority of a channel transmitted through a cell set to the normal CP may be set higher than that of a channel transmitted through a cell set to the extended CP.

Rule 3-8: Cell Priority

Cell protection priority can be applied (when channels have the same UCI priority). The cell priority may be predetermined (e.g., PCell>SCell) or set through RRC signaling and the like. For example, when A/N transmission corresponding to DL data reception in a PCell (or a cell group to which the PCell belongs) collides with A/N transmission corresponding to DL data reception in an SCell (or a cell group consisting of only SCells) at the same timing, power can be reduced or transmission can be dropped for a channel carrying SCell A/N.

Rules 3-1 to 3-8 may be used alone or in combination. In this case, a rule or rule combination to be used may be predetermined or set through RRC signaling and the like.

Meanwhile, transmission timings of PRACHs and/or SRSs may overlap in the same subframe or transmission timing of a PRACH and/or an SRS and transmission timing of a PUCCH and/or a PUSCH may overlap in the same subframe. In this case, priority may be PRACH>PUCCH/PUSCH>SRS. Priority of the PUCCH/PUSCH may be determined by Rules 3-1 to 3-8. In the case of collision between PRACHs and collision between SRSs, powers for the PRACHs and SRSs may be reduced at equal scaling, Rule 3-2 (power level), Rule 3-6 (FDD vs. TDD), Rule 3-7 (CP length) and/or Rule 3-8 (cell priority) may be applied, or power reduction/transmission drop according to cell protection priority (predetermined or set through RRC signaling and the like) may be applied. In addition, in the case of collision between PRACHs, priority of a PRACH format having a longer (or shorter) OFDMA/SC-FDMA symbol duration may be set to a higher level or priority of a retransmitted PRACH may be set higher than that of an initially transmitted PRACH.

A description will be given of power control using a DCI format. Power control using a DCI format (e.g., a DL/UL grant DCI format including a TPC command and/or DCI format 3/3A for UE group power control) is applicable even when a single cell is configured. While the following description has focused on DCI format 3/3A for convenience, the following description can be equally/similarly applied to a DCI format including a TPC field. Specifically, the same TPC command value and/or the same number of values are applied to all cells in the conventional technology. For example, a conventional TPC command has four values of −1, 0, 1 and 3 dB (i.e., 2-bit TPC field size). An independent TPC command value and/or number of values (e.g., independent TPC field size) may be set/applied per cell (group) in consideration of a coverage difference between cells and/or different interference environments of cells in a CA situation in which a macro cell and a micro cell are aggregated (or other CA situations). For example, a TPC command value and/or number of values (e.g. a TPC field size in a DL grant) applied to PUCCH transmission in a PCell may be set to be different from that applied to PUCCH transmission in an ACell. Accordingly, a payload size of DCI format 3/3A can depend on the type of a cell in which DCI format 3/3A is transmitted. Therefore, a UE needs to attempt decoding upon assuming the payload size of DCI format 3/3A depending on the type (e.g., PCell or ACell) of a cell in which the UE wants to receive DCI format 3/3A and to interpret payload of DCI format 3/3A according to the cell type. In addition, a TPC command value and/or number of values (e.g. a TPC field size in a UL grant) applied to PUSCH transmission of cell (group) 1 may be set to be different from that applied to PUSCH transmission of cell (group) 2. Whether to set an independent TPC command value and/or number of values per cell (group) may be explicitly indicated through a higher layer signal (e.g., RRC signal) or indirectly indicated using other information (or parameters). For example, whether to set an independent TPC command value and/or number of values per cell (group) can be indirectly indicated/set using information on whether inter-site CA is applied/set and multi-PUCCH ON/OFF. Specifically, when inter-site CA is applied and multi-PUCCH is set to ON, a TPC command value and/or number of values can be independently set per cell (group).

The TPC command of DCI format 3/3A used for UE group power control is applied to only PCell PUCCH/PUSCH transmission in the conventional technology. However, the present invention can set a cell (group) in which the TPC command of DCI format 3/3A is applied to PUCCH transmission and/or PUSCH transmission through higher layer signaling (e.g., RRC signaling).

Meanwhile, in an environment in which (micro) cells are concentrated in a limited area in a cluster form (or a similar cell environment), TPC command application/accumulation operation may be independently performed per UL SF (set) in consideration of time-variant interference due to inter-cell interference control (and/or different DL/UL resource configurations). For example, UL SFs that can be used for PUCCH transmission can be divided into two SF sets (e.g., SF sets 1 and 2), a TPC command signaled through a DL grant of a DL SF corresponding to SF set 1 can be applied/accumulated to/for only PUCCH transmission of SF set 1, and a TPC command signaled through a DL grant of a DL SF corresponding to SF set 2 can be applied/accumulated to/for only PUCCH transmission of SF set 2. As another example, UL SFs that can be used for PUSCH transmission can be divided into two SF sets (e.g., SF sets 1 and 2), a TPC command signaled through a UL grant that schedules SF set 1 can be applied/accumulated to/for only PUSCH transmission of SF set 1, and a TPC command signaled through a UL grant that schedules SF set 2 can be applied/accumulated to/for only PUSCH transmission of SF set 2. In this case, a TPC command value and/or number of values (e.g. independent TPC field size) can be independently set/applied per SF (set). For example, a TPC command value and/or number of values (e.g. TPC field size) signaled through a DL grant corresponding to PUCCH transmission (e.g. A/N) of SF set 1 can be set to be different from those signaled through a DL grant corresponding to PUCCH transmission (e.g. A/N) of SF set 2. In addition, a TPC command value and/or number of values (e.g. TPC field size) signaled through a UL grant that schedules PUSCH transmission of SF set 1 can be set to be different from those signaled through a UL grant that schedules PUSCH transmission of SF set 2.

A UL SF to which the TPC command of DCI format 3/3A is applied can be determined as follows.

Method 0) The TPC command can be applied to PUCCH/PUSCH transmission of all UL SFs (UL SF sets).

Method 1) The TPC command can be automatically configured to be applied to PUCCH/PUSCH transmission of a specific UL SF (set). For example, the specific UL SF (set) includes a UL SF (set) having the smallest (set) index (in higher layer (e.g., RRC) signaling/configuration).

Method 2) A UL SF (set) through which PUCCH/PUSCH transmission to which the TPC command is applied is performed can be designated through higher layer signaling (e.g., RRC signaling).

Method 3) When transmission/reception timing of the TPC command (referred to as 3/3A-TPC timing) belongs to or is associated with a specific UL SF set (e.g., when 3/3A-TPC timing corresponds to DL grant timing corresponding to the specific UL SF set and/or UL grant timing scheduling the specific UL SF set), the TPC command can be applied to PUCCH/PUSCH transmission of the specific UL SF set. Otherwise (i.e. when 3/3A-TPC timing does not belong to/is not associated with the specific SF set), the following options can be considered. Option i) method 0), 1) or 2) is applied, Option ii) the TPC command is applied to PUCCH/PUSCH transmission of an SF set that is closest to the 3/3A-TPC timing (and/or the 3/3A-TPC timing+a specific SF offset) before or after the 3/3A-TPC timing (and/or the 3/3A-TPC timing+a specific SF offset), or Option iii) the TPC command is not applied to any SF set. In an example of implementation of Option iii), a UE can operate on the assumption that DCI format 3/3A (TPC command) is not transmitted/received at timing that does not belong to/is not associated with a specific SF set. For example, the UE can skip blind decoding for DCI format 3/3A at timing that does not belong to/is not associated with a specific SF set.

Method 4) An RNTI (e.g., TPC-PUSCH-RNTI, TPC-PUCCH-RNTI) used for (CRC) scrambling of DCI format 3/3A can be allocated per SF (set). The UE can attempt blind decoding for DCI format 3/3A using a plurality of RNTIs and apply the TPC command to PUCCH/PUSCH transmission of an SF (set) corresponding to a detected RNTI.

Method 5) A plurality of TPC command fields (e.g., TPC command numbers) respectively corresponding/applied to a plurality of SFs (SF sets) can be allocated to one DCI format 3/3A. In this case, the plurality of TPC command fields can be arranged in SF (set) index order in the DCI format or include information indicating SFs (SF sets) to which the TPC field is applied. The UE can apply a plurality of TPC commands allocated thereto in the detected DCI format 3/3A to PUCCH/PUSCH transmissions of the corresponding SFs (SF sets).

Whether a plurality of RNTIs and/or a plurality of TPC commands are used/allocated for DCI format 3/3A may be explicitly indicated through a higher layer signal (e.g., RRC signal) or an L1/L2 signal (e.g., PDCCH signal) or indirectly indicated using other information (or parameter). For example, whether a plurality of RNTIs and/or a plurality of TPC commands are used/allocated for DCI format 3/3A can be indirectly indicated/set using information on whether inter-site CA is applied/set and multi-PUCCH ON/OFF. Specifically, when inter-site CA is applied/set and/or the multi-PUCCH is set to ON, a plurality of RNTIs and/or a plurality of TPC commands can be used/allocated for DCI format 3/3A.

The present invention provides additional reporting of UL transmission related information of each cell (group), which is used for PHR determination when PHR transmission is performed, for more appropriate and adaptive UL power control/management in a CA situation in which cells (cell groups) belonging to different eNBs are aggregated for one UE. Here, additional information about UL transmission of each cell (group) may be reported through a corresponding PHR or reported separately from the corresponding PHR. For example, the UL transmission related information of each cell (group) can include at least one of presence/ absence of UL transmission of each cell (group), types of UL signals/channels (e.g., PUCCH, PUSCH, PRACH and SRS) transmitted through each cell (group), types of UCI (e.g., A/N, SR and CSI) transmitted through each cell (group), used resource information (e.g., RB index/region), an applied modulation scheme (e.g., QPSK, 16-QAM or 64-QAM), and an applied specific parameter value (e.g., MPR (Maximum Power Reduction) or A-MPR(Additional-MPR)). In addition, a PHR type (e.g., Type 1 that reflects only PUSCH power or Type 2 that reflects both PUCCH power and PUSCH power) can be independently set per cell (group). Accordingly, (when PHRs with respect to a plurality of cells (cell groups) are simultaneously transmitted) the additional information about UL transmission of each cell (group) can further include a PHR type set for each cell (group). Here, additionally reported information during PHR reporting may be limited to UL transmission information of other cell groups other than the corresponding self-cell group. For example, when cell group 1 and cell group 2 are aggregated for one UE, the UE can report PHRs with respect to all cell groups and UL transmission related information about cell group 2 through cell group 1, and report PHRs with respect to all cell groups and UL transmission related information about cell group 1 through cell group 2.

Whether simultaneous transmission of multiple PUCCHs is permitted and/or whether simultaneous transmission of a PUCCH and a PUSCH is permitted can be set per SF (set) in consideration of UL transmission based on TDM of cells/TPs (Transmission Points) having different coverages and time-variant UL channel/interference state (due to the TDM based UL transmission), UL transmission signal distortion/deterioration and the like. In addition, whether simultaneous transmission of CSI and A/N is permitted and/or information related thereto (e.g. periodic CSI transmission PUCCH resource allocation and the like) can be set per SF (set). Furthermore, whether simultaneous transmission of an SRS and A/N is permitted and/or information related thereto (e.g. SRS transmission band/region allocation, related parameter configuration and the like) can also be set per SF (set). Moreover, whether (TxD based) PUCCH transmission using multiple antennas is set and/or information related thereto (e.g., PUCCH resource allocation, power control (offset) parameter configuration and the like) can be set per SF (set).

Figure 16:
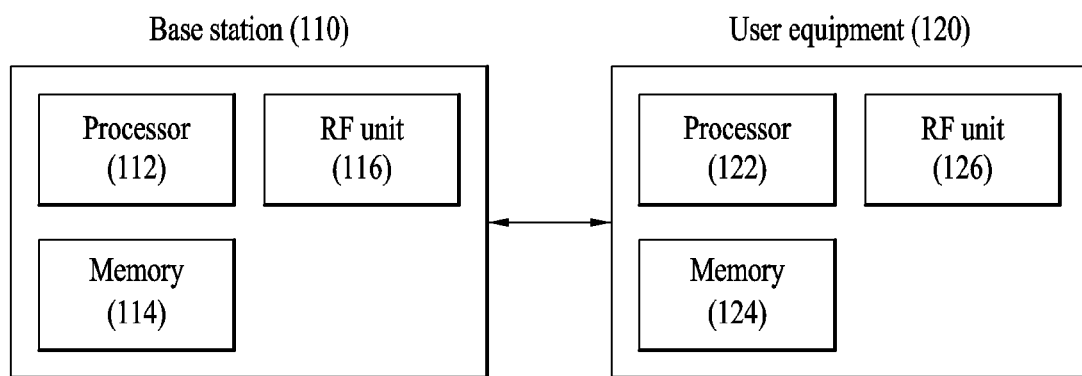
FIG. 16 illustrates a base station and a UE applicable to the present invention.

FIG. 16 is a diagram for an example of a base station and a user equipment applicable to the present invention. In case that a system includes a relay, the base station or the user equipment can be replaced by the relay.

Referring to FIG. 16, a wireless communication system includes a base station (BS) 110 and a user equipment (UE) 120. The base station 110 includes a processor 112, a memory 114 and a radio frequency (RF) unit 116. The processor 112 can be configured to implement the procedure and/or methods proposed by the present invention. The memory 114 is connected to the processor 112 and configured to store various information related to the operation of the processor 112. The RF unit 116 is connected to the processor 112 and configured to transmit and/or receive a radio signal. The user equipment 120 includes a processor 122, a memory 124 and a radio frequency (RF) unit 126. The processor 122 can be configured to implement the procedure and/or methods proposed by the present invention. The memory 124 is connected to the processor 122 and configured to store various information related to the operation of the processor 122. The RF unit 126 is connected to the processor 122 and configured to transmit and/or receive a radio signal. The base station 110 and/or the user equipment 120 may have a single antenna or multiple antennas.

The above-mentioned embodiments correspond to combinations of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

In this specification, embodiments of the present invention are described centering on the signal transmission/ reception relations between a user equipment and a base station. In this disclosure, a specific operation explained as performed by a base station can be occasionally performed by an upper node of the base station. In particular, in a network constructed with a plurality of network nodes including a base station, it is apparent that various operations performed for communication with a user equipment can be performed by a base station or other networks except the base station. In this case, 'base station' can be replaced by such a terminology as a fixed station, a Node B, an eNode B (eNB), an access point, and the like. And, 'user equipment' can be replaced by such a terminology as a user equipment (UE), a mobile station (MS), a mobile subscriber station (MSS) and the like.

Embodiments of the present invention can be implemented using various means. For instance, embodiments of the present invention can be implemented using hardware, firmware, software and/or any combinations thereof. In case of the implementation by hardware, one embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, one embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the means well-known to the public.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

Accordingly, the present invention can be used by such a wireless communication device as a user equipment device, a relay, a base station, and the like.

What is claimed is:

1. A method for controlling transmission power by a communication apparatus in a carrier aggregation based wireless communication system, the method comprising:
    transmitting a first physical uplink control channel (PUCCH) including first uplink control information (UCI) via a first cell, the first UCI being a first type UCI having a first priority; and
    transmitting a second PUCCH including a second UCI, via a second cell, the second UCI being a second type UCI having a second priority,
    wherein a transmission power of the first PUCCH and a transmission power of the second PUCCH are controlled according to a power allocation rule, based on a total transmission power of the UE exceeding a transmission power limit, and
    wherein the power allocation rule includes:
        preferentially reducing the transmission power of the second PUCCH when the first priority is higher than the second priority, and preferentially reducing the transmission power of the first PUCCH when the second priority is higher than the first priority, and
        preferentially reducing one of the transmission power of the first PUCCH and the transmission power of the second PUCCH based on a priority between the first and second cells when the first priority is equal to the second priority.

2. The method according to claim 1,
    wherein at least a portion of the first PUCCH overlaps in time with at least a portion of the second PUCCH.

3. The method according to claim 1,
    wherein the first cell comprises a primary cell (PCell), and the second cell comprises a secondary cell (SCell), and
    wherein a priority of the first cell is higher than a priority of the second cell.

4. The method of claim 1, wherein the first type UCI is the same as the second type UCI.

5. The method of claim 1,
    wherein the first type UCI is different from the second type UCI.

6. The method of claim 1,
    wherein, when the first priority equals the second priority, the first type UCI is the same as the second type UCI.

7. A communication apparatus configured to transmit control information in a wireless communication system, the communication apparatus comprising:
    at least one processor; and
    at least one computer memory operably connected to the at least one processor and storing instructions that, based on being executed by the at least one processor, perform operations comprising:
    transmitting a first physical uplink control channel (PUCCH) including first uplink control information (UCI) via a first cell, the first UCI being a first type UCI having a first priority; and
    transmitting a second PUCCH including a second UCI, via a second cell, the second UCI being a second type UCI having a second priority,
    wherein a transmission power of the first PUCCH and a transmission power of the second PUCCH are controlled according to a power allocation rule, based on a total transmission power of the UE exceeding a transmission power limit, and
    wherein the power allocation rule includes:
        preferentially reducing the transmission power of the second PUCCH when the first priority is higher than the second priority, and preferentially reducing the transmission power of the first PUCCH when the second priority is higher than the first priority, and
        preferentially reducing one of the transmission power of the first PUCCH and the transmission power of the second PUCCH based on a priority between the first and second cells when the first priority is equal to the second priority.

8. The communication apparatus according to claim 7,
    wherein at least a portion of the first PUCCH overlaps in time with at least a portion of the second PUCCH.

9. The communication apparatus according to claim 7,
    wherein the first cell comprises a primary cell (PCell), and the second cell comprises a secondary cell (SCell), and
    wherein a priority of the first cell is higher than a priority of the second cell.

10. The communication apparatus according to claim 7, wherein the first type UCI is the same as the second type UCI.

11. The communication apparatus according to claim 7,
    wherein the first type UCI is different from the second type UCI.

12. The communication apparatus according to claim 7,
    wherein, when the first priority equals the second priority, the first type UCI is the same as the second type UCI.

13. The communication apparatus according to claim 7, further comprising a radio frequency (RF) unit.

* * * * *